US007594570B2

(12) United States Patent
Miessbacher

(10) Patent No.: US 7,594,570 B2
(45) Date of Patent: Sep. 29, 2009

(54) BELT-SHAPED TENSION ELEMENT AND GUIDING SYSTEM FOR THE HANDRAIL OF AN ESCALATOR OR A PEOPLE-MOVER

(75) Inventor: Herwig Miessbacher, Grosslobming (AT)

(73) Assignee: Semperit Aktiengesellschaft Holding, Vienna (AT)

(*) Notice: Subject to any disclaimer, the term of this patent is extended or adjusted under 35 U.S.C. 154(b) by 1479 days.

(21) Appl. No.: 10/911,565

(22) Filed: Aug. 5, 2004

(65) Prior Publication Data

US 2005/0067253 A1 Mar. 31, 2005

Related U.S. Application Data

(63) Continuation of application No. PCT/AT02/00042, filed on Feb. 6, 2002.

(51) Int. Cl.
*B65G 15/00* (2006.01)

(52) U.S. Cl. ...................................... 198/335; 198/337

(58) Field of Classification Search ................. 198/335, 198/336, 337, 338

See application file for complete search history.

(56) References Cited

U.S. PATENT DOCUMENTS 1,868,771 A 7/1932 Shonnard
3,048,256 A * 8/1962 Skinner ...................... 198/337
3,321,060 A * 5/1967 Mullis et al. ................ 198/321
3,373,067 A 3/1968 Hagstrom
3,463,290 A * 8/1969 Tajima ....................... 198/337
3,620,346 A 11/1971 Brooke et al.
3,620,357 A 11/1971 Folkes
3,666,085 A 5/1972 Folkes
3,688,889 A * 9/1972 Koch et al. .................. 198/337
3,865,225 A 2/1975 Phal
4,842,122 A * 6/1989 Van Nort .................... 198/335

(Continued)

FOREIGN PATENT DOCUMENTS

DE 577801 5/1931

(Continued)

OTHER PUBLICATIONS

English Language Abstract of JP 2001-26688.

(Continued)

*Primary Examiner*—Douglas A Hess
(74) *Attorney, Agent, or Firm*—Greenblum & Bernstein, P.L.C.

(57) ABSTRACT

A handrail for one of an escalator and a people-mover the includes a cross-section formed by a first upper cross-sectional part and a second lower cross-sectional part, the first cross-sectional part that includes an upper belt structured and arranged to form a handle for individuals to be transported by one of the escalator and the people-mover, the second cross-sectional part that includes a lower belt structured and arranged to form an active connection with a guiding system and a driving system, and a connecting bridge that connects the upper belt to the lower belt, wherein the cross-section has a double "T" shape and the lower belt that includes side areas that extend beyond the connecting bridge as viewed in the cross section, and the side areas are wedge-shaped. The instant abstract is neither intended to define the invention disclosed in this specification nor intended to limit the scope of the invention in any way.

43 Claims, 8 Drawing Sheets

U.S. PATENT DOCUMENTS

| | | | | |
|---|---|---|---|---|
| 5,271,492 | A | 12/1993 | Lewin et al. | |
| 6,237,740 | B1 * | 5/2001 | Weatherall et al. | 198/337 |
| 2002/0046917 | A1 | 4/2002 | Okano et al. | |

FOREIGN PATENT DOCUMENTS

| | | |
|---|---|---|
| DE | 1268053 | 5/1968 |
| DE | 2003051 | 7/1970 |
| DE | 2252763 | 5/1974 |
| DE | 2813028 | 5/1979 |
| DE | 4130819 | 3/1993 |
| DE | 19837916 | 8/1998 |
| DE | 19832158 | 2/1999 |
| DE | 19850037 | 5/1999 |
| DE | 19829326 | 11/1999 |
| EP | 1 107 928 | 6/2001 |
| EP | 1172310 | 1/2002 |
| FR | 2025538 | 9/1970 |
| GB | 391440 | 4/1933 |
| GB | 1354390 | 5/1974 |
| GB | 1545063 | 5/1979 |
| JP | 64-48795 | 2/1989 |
| JP | 4-32491 | 2/1992 |
| JP | 2001-26688 | 1/2001 |

OTHER PUBLICATIONS

English Language Abstract of JP 64-48795.
English Language Abstract of JP 4-32491.

* cited by examiner

BELT-SHAPED TENSION ELEMENT AND GUIDING SYSTEM FOR THE HANDRAIL OF AN ESCALATOR OR A PEOPLE-MOVER

CROSS-REFERENCE TO RELATED APPLICATIONS

The present application is a Continuation of International Patent Application No. PCT/AT02/00042 filed Feb. 6, 2002, the disclosure of which is expressly incorporated by reference herein in its entirety.

BACKGROUND OF THE INVENTION

1. Field of the Invention

The invention relates to a belt-like tension element, a guiding device and a driving device for the tension element, as well as to a conveying device including the tension element, for a handrail, guiding system, driving system, and a conveyor for an escalator or a people-mover with a cross-section formed by a first, in particular upper cross-sectional part, and a second, in particular lower cross-sectional part, whereby the first cross-sectional part is adapted to form a handle for individuals to be transported with the escalator or people-mover. Furthermore, it relates to the application of the belt-shaped tension element as a conveyor belt or handrail such as an application of the belt-shaped tension element as a conveyor belt particularly for a belt conveyor, or an application of the belt-shaped tension element as a handrail for an escalator or a people-mover.

Tension elements of the type defined by the invention are employed in the prior art, for example in belt conveyors, and as handrails for escalators and people-movers or the like.

2. Discussion of Background Information

Belt conveyors are known to be include a revolving endless belt that is partly supported by reversing rollers arranged on the two end sections of the belt opposing one another. Merchandise is conveyed by the so-called upper strand of the belt; its lower strand returns empty for receiving more merchandise. In belt conveyors, individual guiding rollers have been employed heretofore for preventing the belt from migrating sideways. Endless conveyor belts consist of rubber or plastic depending on whether piece goods, non-wearing or sticky bulk materials are conveyed at up to 100° C., and are equipped with fabric or steel inserts for their reinforcement.

Handrails for escalators, people-movers or similar applications are employed as safety elements for transporting people. For this purpose, the handrail has to allow the rider to safely grip such elements, and must be capable of withstanding the dynamic stress or environmental influences while in operation without suffering damage. Handrails known in the prior art have a C-shaped cross-section and are normally built up from a multitude of different materials so as to satisfy such requirements. The surface of the handrail that the rider can touch is usually made of an elastomer mixture. Furthermore, the molding of the handrail protects all components arranged beneath it against various environmental influences, and therefore has to be resistant to such influences. Reinforcing inserts such as, for example fabric cords, mixtures reinforced by short fibers etc., are normally used for increasing the dimensional stability of the cross-section of the handrail. An adequately high rigidity of the lip, i.e. stiffness of the lateral areas of the handrail, can be achieved in this way as well. It is expected that the handrail will maintain its cross-sectional shape throughout its useful life, i.e. the cross-section may neither increase nor decrease excessively in the course of its service life. In addition to strong development of noise if the handrail is contacted, any such reduction would lead to generation of heat, driving problems, and finally to destruction of the handrail. The consequence of any increase, on the other hand, would pose a hazard in that the rider could get caught between the lip of the handrail and the guide rail, on the one hand, and the handrail could jump out of the guide rail on the other.

Furthermore, over its cross-section, the handrail contains so-called tension carriers for receiving longitudinal forces. Such tension carriers have to exhibit a defined minimum tearing strength also in the joint area.

Finally, the so-called sliding layer forms the contact surface of the handrail with its guiding and driving systems.

A handrail with a C-shaped cross-section is known, for example from DE 198 32 158 A1. This handrail consists for its major part of a thermoplastic elastomer, and the surface pointing inwards has a section made of a material having a lower hardness than the thermoplastic elastomer. The ends of the C-shaped cross-section, which are referred to as the nose areas, are made of a harder elastomer and are forming channels for receiving guiding means. The driving roller is arranged in a manner such that it comes into contact with the soft elastomer, the latter forming part of the inner surface and being centrally arranged in the cross-section. A profile element is employed as the guiding means that is substantially filling the cavity formed by the C-shaped profile, and partially enveloped by the two nose areas. The inner surface of the handrail facing the guiding element may be plane or profiled as well. The drawback thereof is that a multitude of different elements are employed for building up the cross-section, and, furthermore, that in addition to the driving means resting against the inner surface of the handrail, a driving means is present also on the outer surface facing the rider, which causes the latter surface, which is visible while the system is in operation, to be stressed accordingly, and the driving means to leave score marks on the surface, which substantially reduce the service life of the handrail.

A guiding system for a handrail is known from DE 198 29 326 C1. This guiding system is particularly used for handrails with a C-shaped cross-section in the areas of reversal, and is built up from a multitude of individual elements that require continuous maintenance to some extent, for example such as servicing of the antifriction bearings contained therein.

Furthermore, a handrail drive is known from DE 198 50 037 A1, where the handrail has to be flexed across its back and the visible surface of the handrail again comes directly into contact with the driving system. Such a stress causes fouling not only of the back of the handrail, but leaves behind the aforementioned score marks on the surface of the handrail, whereby the negative flexure may cause growth of cracks and failure of the handrail as well. Moreover, it is necessary in connection with this driving system to pretension the handrail so as to be able to transmit the additional driving torque. It is a drawback in that connection that the useful life of the handrail is reduced by excessive pretension of the handrail due to increased de-lamination, on the one hand, and change in the length of the handrail on the other. For avoiding any direct contact with the driving pulley of the handrail, a hose is arranged on the pulley, and the required pressure is transmitted from the driving pulley to the handrail with the help of such a hose. The hose is filled with air, which ensues the problem that in case of any leakage of the hose, the handrail itself is again in direct contact with the driving pulley.

SUMMARY OF THE INVENTION

The problem of the invention is to design a belt-shaped tension element in such a way that it can be manufactured in a simple manner and at favorable cost. Furthermore, a partial problem of the invention is to propose a tension element, a guiding system and a driving system permitting a conveyor device as defined by the invention to be operated in a safe manner, while the required performance characteristics of the tension element remain nearly unchanged over a long period of time.

The problems are resolved independently of each other by the features such as a belt-shaped tension element for a conveyor device with a across-section formed by a first, in particular upper cross-sectional part, and a second, in particular lower cross-sectional part, whereby the first cross-sectional part is designed for resting against and/or as a guide for and/or handle for individuals or objects to be transported with the conveyor device, and the second cross-sectional part is designed for forming an active connection with a guiding system and/or a driving system, wherein the cross section is T-shaped. Moreover, a guiding system for a belt-shaped tension element of a conveying system, particularly for a belt conveyor, an escalator, a people-mover, with a guiding element with two end areas opposing one another, wherein the guiding element is realized in such a form that the end areas engage a recess formed between an upper and a lower belt of the tension element. Additionally, a driving system for a belt-shaped tension element of a conveyor device, in particular for a belt conveyor, an escalator or a people-mover, including at least one driving element adapted to form an active connection with the tension element. Furthermore, at least one element generating kinetic energy, e.g. a motor, particularly an electric motor; as well as at least one connecting member between the driving element and the element generating kinetic energy, wherein the driving element is arranged in a manner such that the kinetic energy is transmitted to the tension element laterally in relation to its direction of movement, and/or the vertically disposed component of the "T"-shaped or lower belt of the double-"T"-shaped profile of the tension element. Moreover, a conveying device including a revolving endless, belt-shaped tension element, with a guiding system and a driving system for the belt-shaped tension element, whereby the guiding system encloses the belt-shaped tension element at least by sections, and the driving system is actively connected with the belt-shaped tension element, wherein the belt-shaped tension element, which offer the advantage that the cross-section of the tension element, which is novel for this purpose of application, provided the tension element with its own adequate rigidity, so that it is possible to dispense with any additional reinforcing elements of the type known in the prior art for such elements, disregarding the tension carrier for receiving longitudinally acting forces. The tension element can be manufactured in this way from just a very few individual components, and it is in particular possible to realize the tension element in the form of one single piece, so that it can be substantially produced in one single manufacturing step. Owing to the stability of the cross-section, the quantity of rejects can be reduced in a beneficial manner, and the tension element is provided with a longer service life. It is, furthermore, beneficial that both the guiding and the driving systems from prevented from coming into contact with the visible surface of the tension element, particularly the one of a handrail, i.e. the drive is essentially realized laterally or from below, which prevents damage to the surface. Furthermore, with such a driving system, it is possible to avoid the necessity of having to pretension the tension element, and it is furthermore advantageous that owing to both the driving and guiding systems, the tension element is not flexed across its back, which in turn may prolong its useful life as well.

Advantageous embodiments of the tension element include the cross section can be double-"T"-shaped, and that an upper belt can be connected with a lower belt via a connecting bridge. Moreover, viewed in the cross section, the lower belt can have side areas protruding beyond the connecting bridge, the side areas being wedge-shaped, in particular double-wedge-shaped in end areas. Furthermore, viewed in the cross section, at least one transition between the connecting bridge and the upper belt and/or the lower belt can be rounded. Additionally, the first cross-sectional part can form one single piece with the second cross-sectional part, in particular the upper belt with the lower belt and the connecting bridge. Moreover, at least one tension carrier, e.g. a steel cord, steel sheet, an aramid cord can be arranged on and/or in the lower belt. Furthermore, the lower belt and/or the connecting bridge and/or the upper belt can have at least one sliding element by sections, in particular a sliding layer, for example a fabric made of polyamide, cotton, polyester or mixtures thereof. Additionally, the sliding element can form a contact surface for the guiding and/or driving systems. Moreover, the sliding element can have two ends opposing each other, the ends being anchored in the upper belt. Furthermore, the sliding element can at least by sections be arranged on the outer surface of the lower belt and/or the connecting bridge and/or the upper belt, in particular on the surface of the upper belt facing the lower belt. Additionally, viewed in the cross-section, the sliding element can have the contour of at least one cross-sectional part, in particular of the lower belt, the connecting bridge, and at least partially of the component of the upper belt facing the lower belt. Moreover, the surface of the lower belt and/or the connecting bridge and/or the up-per belt can have at least by sections a toothing in a plane extending perpendicular to its cross-sectional area. Furthermore, the toothing can be arranged on the surface of the lower belt facing away from the upper belt. Additionally, the toothing can be arranged on the surface of the side areas of the lower belt, particularly in the wedge- or double-wedge-shaped end areas. Moreover, at least one magnetic or magnetizable element can be arranged at least in and/or on the lower belt. Furthermore, the lower belt and/or the upper belt and/or the connecting bridge can include at least one polymeric material, e.g. a particularly thermoplastic such as TPU, or an elastomer such as rubber. Additionally, the lower belt and/or the upper belt and/or the connecting bridge can be produced by press vulcanization or extrusion.

By selecting a cross-section in the form of a double "T" as set forth by at least one aspect of the present invention, it is possible to further enhance the stability of the section, and the lower strand ensuing therefrom is forming in this way a preferred area of engagement for the driving device, whereby in particular end areas in the form of double wedges are formed preferably for increasing the force and the form-locking property.

Owing to the rounded design of the connecting bridge as set forth by at least one aspect of the present invention, it is possible to gain the benefit that arranging the tension element in a guiding system is facilitated.

Due to the one-piece embodiment of the tension element as set forth by at least one aspect of the present invention, it is possible to facilitate the manufacture of the element and to thus gain the benefit of cost reduction.

By arranging a tension carrier in the tension element as set forth by at least one aspect of the present invention, it is possible in a beneficial manner to absorb longitudinal forces acting on the tension element, whereby it is possible at the same time to obtain by virtue of such tension carriers a reinforced lower strand serving as the site of engagement for the driving device.

Owing to the arrangement of a sliding element as set forth by at least one aspect of the present invention, it is possible to gain the advantage that the sliding friction vis-a-vis the guiding system will not be excessively high, on the one hand, and that the static friction will be adequate for a driving system on the other.

Furthermore, the sliding element as set forth by at least one aspect of the present invention may form the contact surface vis-à-vis the guiding and driving systems. In this way, it is possible to employ for the remaining part of the tension element materials that are not required to withstand such stress.

It is beneficial in this conjunction that the sliding element is safely anchored in the tension element as set forth by at least one aspect of the present invention.

By virtue of the arrangement of the sliding element as set forth by at least one aspect of the present invention, a major part of the surface of the tension element can be protected against environmental influences.

It is advantageous in that connection that the sliding element has a contour as set forth by at least one aspect of the present invention, because a safe connection between the sliding element and the remaining part of the tension element can be realized in this manner.

Arranging a toothing as set forth by at least one aspect of the present invention is beneficial as well because such an arrangement contributes to a further improvement of the non- and/or positive transmission of the kinetic energy to the tension element, on the one hand, while the operational safety of the drive can be enhanced on the other.

Furthermore, it is beneficial if the tension element includes magnetic or magnetizable elements as set forth by at least one aspect of the present invention, as it is possible with such elements to employ a driving system in which a major part of mechanically moving elements can be dispensed with.

It is advantageous if materials as set forth by at least one aspect of the present invention are employed for the tension element, because the tension element can be manufactured with such materials at favorable cost, on the one hand, while in conjunction with the invention, such materials permit a long service life of the tension element on the other.

Finally, it is beneficial if the tension element is produced by press vulcanization or extrusion as set forth by at least one aspect of the present invention, as this will result in only minor tolerances for the cross-section of the tension element.

However, the application of the tension element as set forth by at least one aspect of the present invention as a conveyor belt or a handrail is beneficial as well, as such applications make it possible to propose a system characterized by a long useful life and high operating safety.

Advantageous embodiments of the guiding system include the guiding element can have several components and in particular at least one guide rail, at least one holding and/or supporting element and at least one clamping element. Moreover, the guide rail and the clamping element can have at least by sections correspondingly profiled, in particular toothed surfaces opposing each other. Furthermore, the holding and/or supporting element can have an end area offset by a wall thickness of the clamping element vis-à-vis the remaining area of the holding and/or supporting element. Additionally, the clamping element can have an at least approximately U-shaped profile with a base and two legs. Moreover, the legs can have different lengths and/or enclose different angles with the base. Furthermore, the guide rail is a U-shaped profile. Additionally, the guide rail is non-positively connectable with the holding and/or supporting element via fixing elements, e.g. screws, rivets. Moreover, the holding and/or supporting element can be the balustrade of an escalator or a people-mover.

It is advantageous in this connection if the guiding element of the guiding system is realized in the form of a plurality of components as set forth by at least one aspect of the present invention, because such an embodiment permits a simplification of the installation of the tension element and its maintenance.

By realizing the guide rail and the clamping element as set forth by at least one aspect of the present invention, a safe connection is obtained between the two elements of the guiding system.

It is beneficial in this connection if the end area of the holding and/or supporting element is designed as set forth by at least one aspect of the present invention, because the tension element can be mounted in this way in a simple and very safe manner.

By realizing the clamping element in the form of a U-shaped profile with selectively different legs as set forth by at least one aspect of the present invention, the advantage that can be gained in this way is that such a profile is supported in several sites of the tension element, on the one hand, so that the guidance and retention of the tension element thus can be enhanced, whereas on the other hand, it is possible for the clamping element, in particular in conjunction with a tension element in the form of a double "T", to engage a broad area of the recess between the upper and lower belts of the tension element for further increasing the mounting support of the tension element.

It is beneficial as well if the guide rail is realized as set forth by at least one aspect of the present invention, because the guide rail is capable in this way of accommodating at the same time a part of the driving system.

However, a connection of the guide rail with the holding and/or supporting elements as set forth by at least one aspect of the present invention is advantageous as well, because in this way, not only frictional forces are responsible for holding the elements of the guiding system, on the one hand, but in addition, dismantling of the guiding system is again facilitated as well.

If is advantageous, moreover, if the holding and/or the supporting element is realized in the form of the balustrade of an escalator as set forth by at least one aspect of the present invention, so that it is possible in this manner to eliminate the need for additional elements for building up the escalator or people-mover.

Design variations and further developments of the driving system include the driving element can be formed by at least one belt and/or at least one driving pulley and/or at least one toothed gear and/or a series of conductor loops arranged one after the other in the direction of movement of the tension element and connected to at least one magnet or magnetizable elements. Moreover, in the cross section, the belt can be a V-belt including wedge-shaped end areas with flattened ends arranged on both sides. Furthermore, the belt has a toothing. Additionally, as viewed over the cross section of the belt, the toothing can extend across the circumference. Furthermore, in the cross-section, the belt can have a recess extending along its center axis and dividing the end area of the belt in two jaws opposing one another. Moreover, the conductor loops can be accommodated in a recess extending in the longitudinal direction of the tension element and connected to electric conductors, with north and south poles of the magnets being arranged laterally of the recess in the tension element. Additionally, the driving pulley can be a grooved friction pulley adapted to rest against the tension element, in particular against the double-wedge-shaped end areas of the lower belt of the element.

It is beneficial in this connection if the driving element is designed such that the driving pulley is a grooved pulley adapted to rest against the handrail, in particular against the double-wedge-shaped end zones of the lower belt of said handrail. In this way, driving elements can be made available that for all kinds of different applications and loads. It is also advantageous here that existing conditions can be taken into account accordingly for any later refitting.

It is beneficial in this conjunction if the belt is designed such that the belt is a V-belt including wedge-shaped end areas with flattened ends arranged on both sides; the belt has a toothing (30); when viewed over the cross section of the belt, the toothing is extending across the circumference; when viewed in the cross-section, the belt has a recess extending along its center axis and dividing the end area of the belt in two jaws opposing one another, as this permits safe transmission of the force and, furthermore, permits the belt to safely engage the corresponding recess of the tension element. It is advantageous in this conjunction, moreover, if a toothing of the belt is extending over the full circumference, so that additional transmission elements, particularly belt pulleys can be omitted.

Furthermore, it is beneficial to realize the driving system such that the conductor loops are accommodated in a recess extending in the longitudinal direction of the tension element and connected to electric conductors, with north and south poles of the magnets being arranged laterally of the recess in the tension element so that it will include fewer moving components.

However, it is possible also to design the driving system in the form of a driving pulley such that the driving pulley is a grooved friction pulley adapted to rest against the tension element, in particular against the double-wedge-shaped end areas of the lower belt of said element; and the driving pulley, in particular the grooved pulley particularly has a countersunk toothing extending over the circumference. This permits providing a driving element that is adapted to the given amount of force to be transmitted.

Finally, further developments of the conveyor device include the guiding system formed as noted above and as such are advantageous, which permits providing a coordinated system for such a conveyor system.

One aspect of the invention includes a handrail for one of an escalator and a people-mover the includes a cross-section formed by a first upper cross-sectional part and a second lower cross-sectional part, the first cross-sectional part includes an upper belt structured and arranged to form a handle for individuals to be transported by one of the escalator and the people-mover, the second cross-sectional part includes a lower belt structured and arranged to form an active connection with a guiding system and a driving system, and a connecting bridge that connects the upper belt to the lower belt, wherein the cross-section has a double "T" shape and the lower belt that includes side areas that extend beyond the connecting bridge as viewed in the cross section, and the side areas are wedge-shaped.

In a further aspect of the invention, the side areas can be partially double-wedge-shaped. Moreover, the handrail can include at least one transition between the connecting bridge and one of the upper belt and the lower belt, wherein the at least one transition is rounded as viewed in the cross section. Furthermore, at least two of the first cross-sectional part, the second cross-sectional part, and the connecting bridge can form a single piece. Additionally, the handrail can include at least one tension carrier composed of at least one of a steel cord, a steel sheet, and an aramid cord, and the at least one tension carrier arranged at least one of on and in the lower belt. Moreover, at least one of the lower belt, the connecting bridge, and the upper belt can include at least one sliding element, the sliding element comprising a sliding layer composed of a fabric made of at least one of a polyamide, a cotton, and a polyester. Furthermore, the at least one sliding element can form a contact surface for one of the guiding system and the driving system. Additionally, the sliding element can have two ends opposing one another anchored in the upper belt. Moreover, the sliding element can be partially arranged on an outer surface of one of the lower belt, the connecting bridge, the upper belt, and the upper belt facing the lower belt. Furthermore, the sliding element can have a contour of at least one of the first cross-sectional part, the second cross-sectional part, the lower belt, the connecting bridge, and a component of the upper belt facing the lower belt, when viewed in the cross section. Additionally, the surface of at least one of the lower belt, the connecting bridge, and the upper belt can have at least partial toothing, in a plane extending perpendicular to a cross-sectional area of a surface. Moreover, the toothing can be arranged on the surface of the lower belt facing away from the upper belt. Additionally, the toothing can be arranged on a surface of side areas of the lower belt. Furthermore, the toothing can be arranged on a surface of side areas of the lower belt. Moreover, the surface of side areas of the lower belt can be in one of wedge and double-wedge-shaped end areas.

In a further aspect of the invention, the handrail can include at least one of a magnetic and magnetizable element arranged at least one of in and on the lower belt. Moreover, one of the lower belt, the upper belt, and the connecting bridge can include at least one of a polymeric material and an elastomer. Additionally, the polymeric material can include TPU and the elastomer can include rubber. Furthermore, at least one of the lower belt, the upper belt, and the connecting bridge can be produced by one of press vulcanization and extrusion. Moreover, the guiding system can include a guiding element having two end areas opposing each other and engaging a recess formed between an upper belt and a lower belt of the handrail, wherein the guiding element that includes of at least one of a guide rail, a holding element, a supporting element, and a clamping element. Additionally, the guide rail and the clamping element can include correspondingly profiled and partially toothed surfaces opposing each other. Furthermore at least one of the holding element and supporting element can have an end area offset by a wall thickness of the clamping element with respect to a remaining area of the at least one holding and supporting element. Additionally, the clamping element can have a substantially U-shaped profile composed of a base and two legs. Moreover, the legs can have at least one of different lengths and different angles jointly with the base. Additionally, the guide rail can have a U-shaped profile. Furthermore, the guide rail can be structured and arranged to be nonpositively connectable with one of the holding element and supporting element with fixing elements. Additionally, at least one of the holding element and supporting element can be a balustrade of one the escalator and the people-mover.

In a further aspect of the invention, a driving system can include at least one driving element structured and arranged to form an active connection with the handrail, at least one element generating kinetic energy, and at least one connecting member between the driving element and the element generating kinetic energy, wherein the driving element is arranged in a manner such that the kinetic energy is laterally transmitted to the handrail in relation to a direction of movement or movement of the lower belt of the double-“T”-shaped profile of the handrail. Moreover, the at least one element generating kinetic energy can be an electric motor. Additionally, the driving element can be formed by at least one of a belt, a driving pulley, and a toothed gear. Furthermore, the belt can be a V-belt having wedge-shaped end areas with flattened ends on both sides, viewed in the cross section. Additionally, the belt can have toothing. Furthermore, the cross section of the belt, the toothing can extend across a circumference. Additionally, the cross section, the belt can have a recess along a center axis, the recess dividing an end area of the belt in two jaws opposing one another. Moreover, the driving pulley can be a grooved pulley structured and arranged to rest against double-wedge-shaped end zones of the lower belt of the handrail. Furthermore, the driving pulley, can have a toothing distributed over a circumference. Additionally, the driving pulley can include a grooved pulley and the grooved pulley has countersunk toothing distributed over a circumference.

In a further aspect of the invention, one of an escalator and a people-mover having a revolving endless handrail can include a guiding system, and a driving system for a belt-shaped tension element, whereby the guiding system partially encompasses the handrail and the driving system is structured and arranged to be connected with the handrail. Moreover, the guiding system can include a guiding element with two end areas opposing one other and engaging a recess formed between an upper and a lower belt of the handrail, wherein the guiding element is comprised of at least one of a guide rail, holding element, supporting element, and a clamping element.

BRIEF DESCRIPTION OF THE DRAWINGS

The invention is described in the interest of superior understanding with the help of the following figures, in which.

DETAILED DESCRIPTION OF THE PRESENT INVENTION

Figure 1:
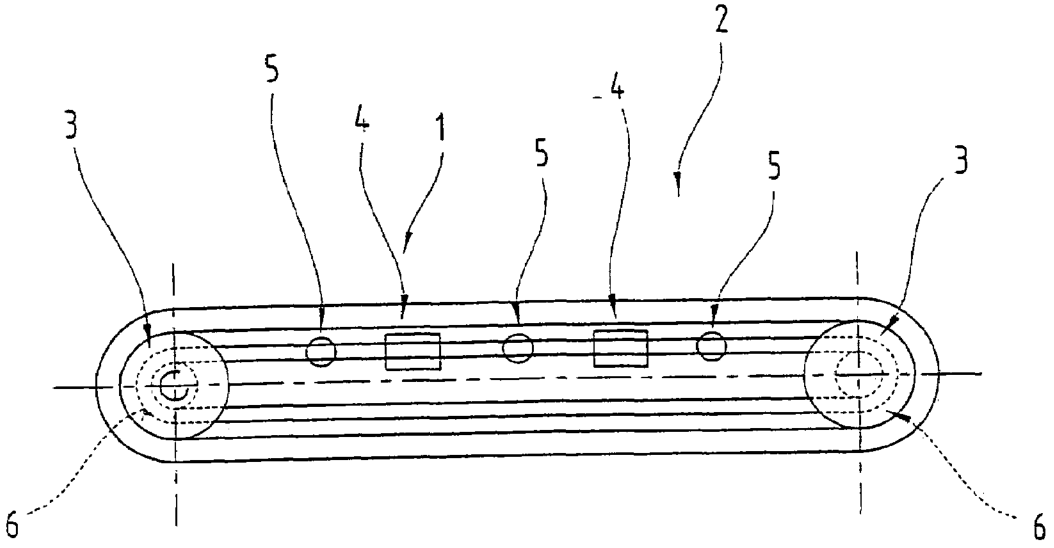
FIG. 1 shows the application of the tension element as defined by the invention in a schematically shown and highly simplified belt conveyor.

It is noted as an introduction that with the various forms of embodiment described herein, identical components are provided with identical reference numerals and identical component designations, whereby the disclosures contained in the entire specification can be applied in the same sense to identical components identified by the same reference numerals and the same component designations. Furthermore, positional data such as, e.g. “on top”, “at the bottom”, “laterally” etc. relate to the directly described and shown figure, and, where a position is changed, have to applied to the new position accordingly. Moreover, individual features or combinations of features in the various exemplified embodiments described and shown herein may represent independent inventive solutions or solutions as defined by the invention.

It is expressively pointed out a priori that individual elements of the design variations of the individual systems or devices are interchangeable and can be applied to other design variations accordingly.

Figure 2:
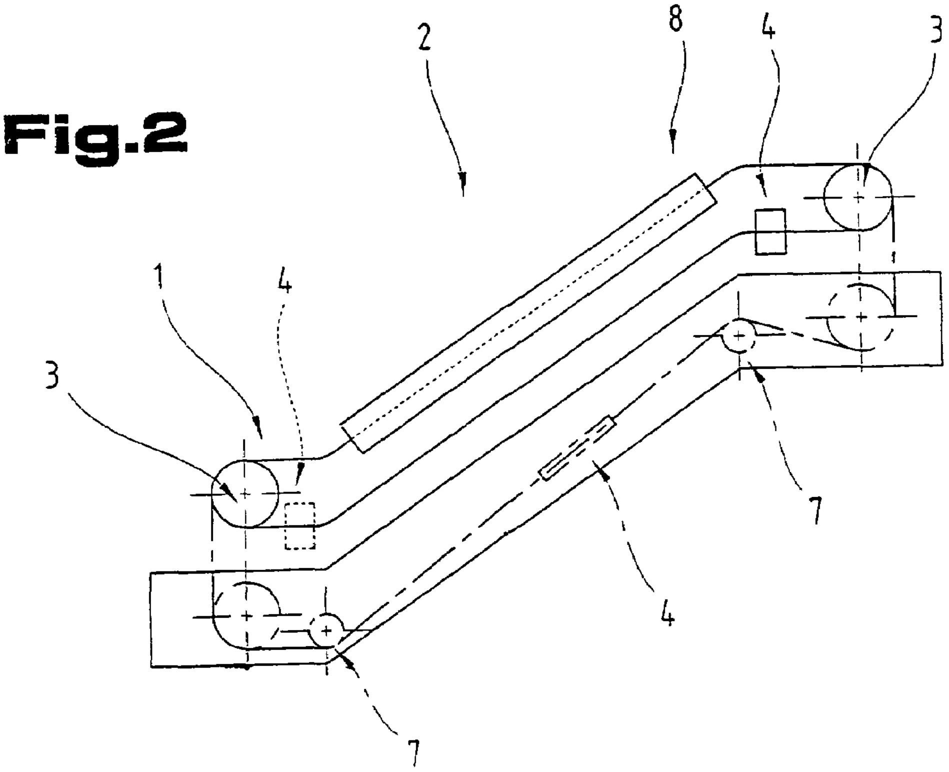
FIG. 2 shows the application of the tension element in an escalator shown by a schematic, highly simplified representation.

FIGS. 1 and 2 each show different possibilities for employing a tension element 1 in a conveyor system 2, specifically in FIG. 1 in the form of a belt conveyor, and in FIG. 2 in the form of an escalator. The two application possibilities for the tension element 1 are representative for a great number of other possible applications, e.g. in the form of a people-mover.

The conveyor device 2 according to FIG. 1, in addition to the tension element 1 that is designed in the form of an endless belt, and includes a reversing roller 3 at each of the two ends opposing each other, as well as one or more driving systems 4, or of the driving elements forming such driving systems at least in part. The driving elements may be arranged both on the upper and lower strands of the belt. Furthermore, support rollers 5 may be associated with the tension element 1 in case the inherent rigidity of the tension element 1 is inadequate. The support rollers 5 are preferably arranged on the upper strand, one on the left and the other on the right side, with a spacing from each other viewed in the direction of conveyance.

The reversing rollers 3 each have a recess 6 preferably disposed in their centers, in which a part of the tension element 1 is guided. In addition, it is naturally possible to provide for an arrangement of an additional support not shown in FIG. 1.

The conveyor device 2 according to FIG. 2 has the reversing rollers 3 disposed at the ends as well, on which the tension element 1, which again has the form of an endless belt designed in the form of a handrail, changes direction. Since escalators are usually include two horizontal parts and one inclined part, additional supporting and/or reversing rollers may be arranged in each site where the direction of the tension element 1 changes, or it is possible that the guiding function is assumed by a schematically indicated guiding system 8. One or a plurality of the driving systems 4 or driving elements are associated with the tension element 1. Such systems or elements are preferably placed in a substructure of the conveyor device 2, so that they are not visible to the rider, and so as to permit an undisturbed and safe operation of the tension element 1 or the conveyor device 2 that is protected against vandalism to the greatest possible extent.

The conveyor devices 2 according to FIGS. 1 and 2 are shown schematically and the individual elements such as the tension element 2, the driving system 4 as well as the guiding system 8 are explained in detail in the following.

Figure 3:
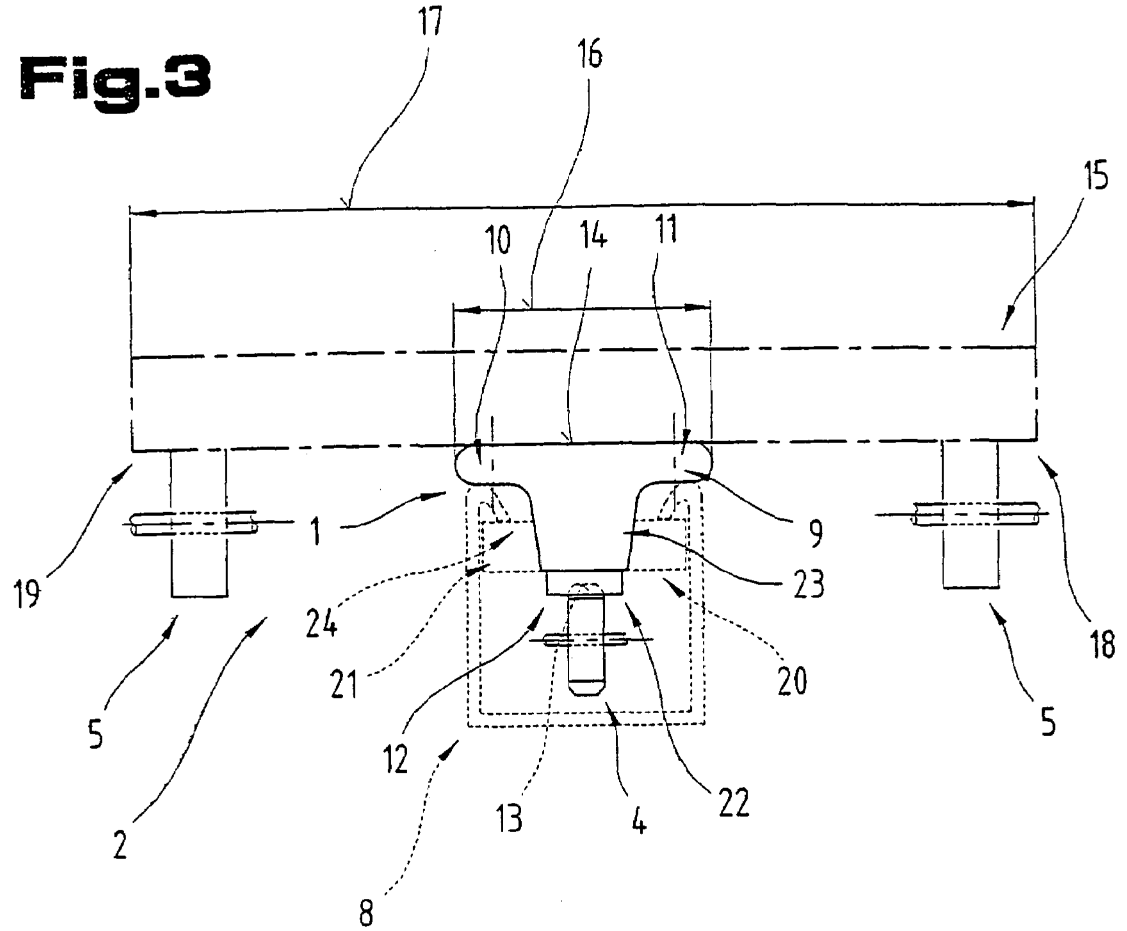
FIG. 3 is the cross-section of a tension element with a driving system as defined by the invention shown in a simplified representation.

FIG. 3 shows a design variation of the tension element 1 with a "T"-shaped cross-section. An upper belt 9 forming a first and preferably upper cross-sectional part includes the preferably rounded side areas 10, 11. The latter, of course, may be realized also in any other desired form, for example with an angular configuration.

Figure 4:
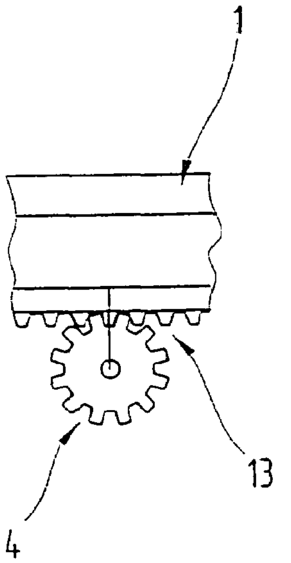
FIG. 4 is a side view of the design variation of the tension element with the driving system according to FIG. 3 shown in a schematically simplified representation.

The driving system 4 is associated with the tension element 1 on an underside 12 of the "T"-shaped profile, i.e. on a second and in particular lower cross-sectional part, and is actively connected with the tension element 1 as shown in detail in FIG. 4.

The driving system 4 is designed in the form of a toothed gear, and the tension element 1 has a mating counter toothing 13 on the underside 12 for transmitting the driving force.

In both the present exemplified embodiment and all the other exemplified embodiments, the tension element 1 may consist of a polymer, for example a natural polymer such a rubber, but also of other plastics, e.g. such as a thermoplastic urethane (TPU). However, other materials are possible as well if so required by the statics of the tension element 1, for example materials such as metals that can be processed by extrusion. Since the tension element 1 is preferably designed as an endless belt, the material for the tension element 1 is usefully selected in a way such that a curvature of the latter, for example in the areas of the reversing rollers 3 (not shown in FIG. 3) is permissible without damaging the tension element 1.

As shown in FIG. 3 by dash-dotted lines, a support element 15 for merchandise to be conveyed may be arranged on the surface 14 of the upper belt 9 opposing the underside 14 if a width 16 of the "T"-shaped profile of the tension element 1 is inadequate. It has to be mentioned in this connection that the width 16 of the tension element 1 may naturally be variable and is not limited to the schematically shown design variation according to FIG. 3.

The arrangement of the support element 15 may be required particularly if the inherent rigidity of the tension element 1 is inadequate for conveying goods, in particular heavy goods. Even though additional reinforcing elements can be arranged in the "T"-shaped profile, it is preferred that the tension element 1 does not include such reinforcing elements, so that the "T"-shaped profile can be produced in a significantly simplified way.

The support element 15 may be made of any desired materials known from the prior art in conjunction with belt conveyors. It is possible to use as materials rubber, plastics with fabric and/or steel inserts, metal strip material or the like depending on which type of merchandise is to be conveyed, i.e. whether wearing and non-wearing, sticky goods or the like, and bulk materials or the like. For securing the support element 15 on the surface 14 of the tension element 1, it is possible to employ any known approach in the prior art; e.g. fastening with screws is feasible particularly via the side areas 10, 11 of the tension element 1. Gluing is conceivable as well.

Furthermore, with a very large width 17 of the support element 15, it is possible to arrange the support rollers 5 in the lateral areas 18, 19. Such support rollers 5 are preferably designed in such a way that they will not extend over the entire width 17 of the support element 15, so that a flawless run of the tension element 1 is possible, with the tension element 1 being arranged at least in about the center of the support element 15. However, the supporting rollers 15 may also serve the purpose of realizing the support element in the form of a trough, so that loose bulk materials can be transported with the conveyor device 2 without problems as well.

It is, of course, impossible to increase the width 16 of the tension element 1, so that the additional support element 15 can be dispensed with, if need be, whereby it is, of course, feasible also in that case to make provision for the support rollers 5 in order to support to side areas 10, 11 of the tension element 1.

In connection with very wide conveyor devices 2 in the form of a belt conveyor, it is possible, furthermore, to make provision for arranging not only one tension element 1 at least in about the center of the conveyor device 2, but for two or more of the tension elements 1.

A design variation of the guiding system 8 as defined by the invention is schematically shown by dashed lines in FIG. 3. For this system, the extensions 20, 21 can be laterally arranged on the "T"-shaped profile of the tension element 1 in the area of the underside 12. These extensions 20, 21 are jointly formed in the production of the profile for the tension element 1 so as to produce one single piece jointly with the profile. Owing to such a design of a profile in the form of a double "T", the tension element 1 is then including, in addition to the upper belt 9, a lower belt 22 as well, forming at least partly the second cross-sectional component, whereby the belts are joined with each other by a connecting bridge 23 disposed between the upper and lower belts 9 and, respectively, 22. Since the connecting bridge 23 has a smaller width than the upper belt 9 and the lower belt 22 when viewed in the cross section, a recess 24 is formed between the belts that can be engaged by at least a part of the guiding system 8. In other respects, reference is made here in particular to the explanations pertaining to FIG. 15.

The arrangement of the guiding system 8 is especially beneficial if the guidance feasible via the reversing rollers 3 is inadequately affected by the recesses 6 in the reversing rollers 3.

For simplifying the graphic representation, only the application purpose "handrail" is addressed for the tension element 1 in connection with the following design variations. The latter are naturally applicable accordingly to other application purposes as well, for example to belt conveyors etc.

Figure 5:
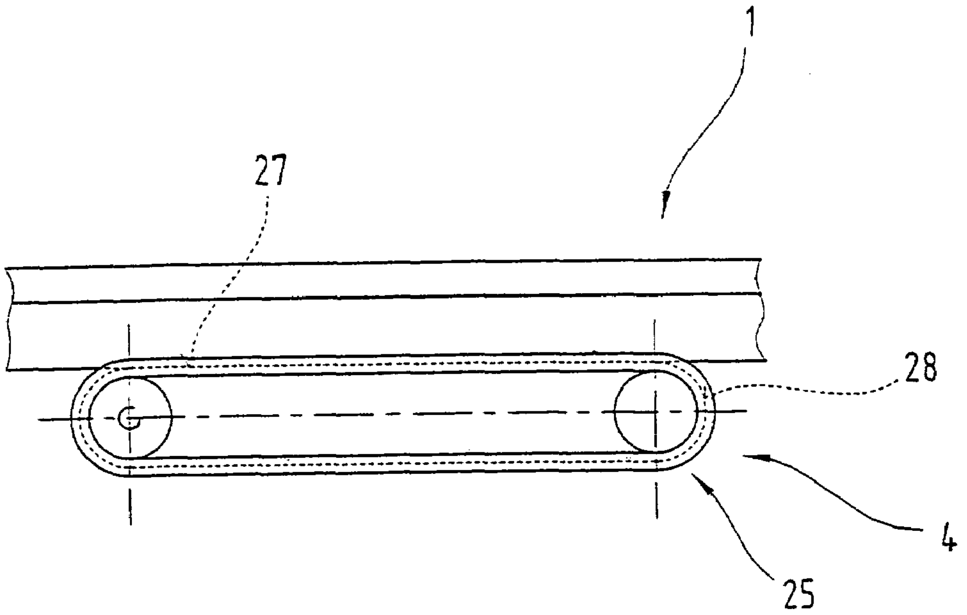
FIG. 5 is a side view of a design variation of the tension element with a driving system shown in a simplified representation.
Figure 6:
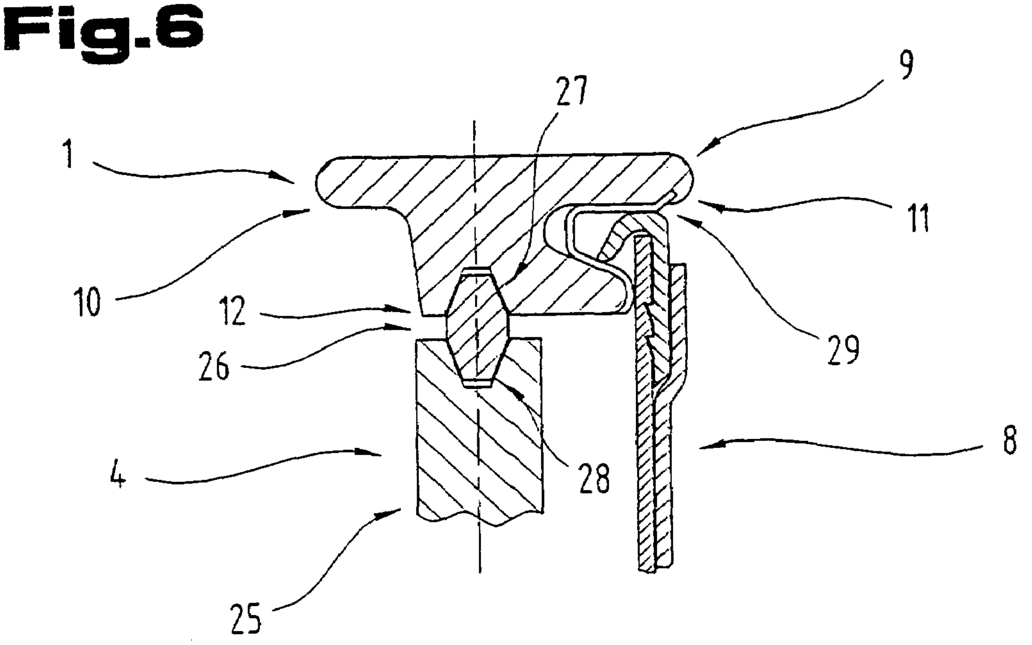
FIG. 6 is a front view of the design variation according to FIG. 5 shown by a sectional view with the driving belt shown, as well as of part of a design variation of the guiding system, in a schematically simplified representation.

FIGS. 5 and 6 show a design variation of the driving system 4 for the tension element 1, where the tension element 1 can be realized in the form of a double-"T"-shaped or a single "T"-shaped profile depending on whether any additional guiding system 8 (shown in FIG. 6 on the right) is required or not. Again, the upper belt 9 is preferably realized with the rounded side areas 10, 11 in order to enhance, in the case of handrail application, the ease of gripping such a handrail for people transported on escalators and people-movers etc.

Handrails of the type defined by the invention are usually arranged on the top end of the balustrade of escalators, people-movers etc. In addition, it is naturally possible also to arrange the tension element 1 as defined by the invention within the area of the treadboards of escalators or people-movers, where the individuals to be moved, in the present case people, find support, i.e. are standing, so as to be able to move also the elements via the tension element 1 or the driving system 4. It should be noted here that in conjunction with the invention, the term "individuals" refers not only to individual people, but relates to various goods such a bulk materials, piece goods etc. as well.

The driving system 4 according to FIGS. 5 and 6 is realized in the form of a belt drive, whereby a belt 26 for transmitting the force is arranged between a belt pulley 25 and the "T"- or about double-"T"-shaped profile of the tension element 1, as shown in detail in FIG. 6 (shaded areas as normally used in sectional representations are omitted to some extent for reasons of clarity).

The driving system 4, of course, has not to be arranged over the entire length of the tension element 1, the latter again being realized in the form of an endless, revolving belt, but provision is rather made for preferably arranging it only by sections as shown, e.g. in the substructure of the escalator as shown in FIG. 2.

The belt 26 can be provided with any desired shape with respect to its cross-section, for example in the form of a double wedge with flattened end areas as shown in FIG. 6. In accordance with the contour of the belt 26, both the belt pulley 25 and the tension element 1 are provided on the underside 12 with the notches 27, 28, i.e. either in the area of the lower belt 9 or in the area of the vertically extending component of the "T"-shaped profile, so that the force can be transmitted by friction grip.

Figure 15:
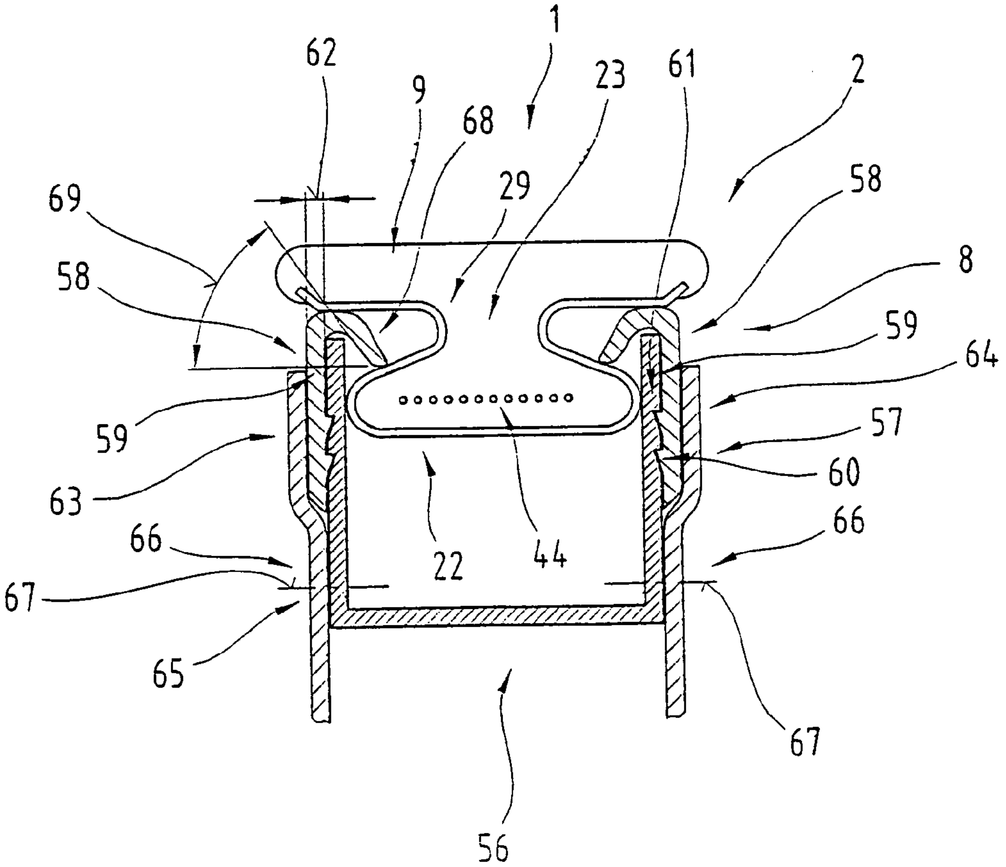
FIG. 15 is a frontal, partly sectional view of the design variation of a guiding system as defined by the invention, in a schematically simplified representation.

The driving system 4 also can be arranged in such a manner that at least a part of it is accommodated in the guiding system as shown, e.g. in FIG. 15. In this way, the belt 26 is prevented from jumping off sideways, and the height of the construction of the entire conveyor device 2, for example the one according to FIGS. 1 and 2, can be reduced, which is achieved preferably at the same time.

As mentioned above, a guiding system 8 as defined by the invention is shown in the right-hand part of FIG. 6. The system may be realized in particular in the form of several components, whereby reference is made again to the explanations relating to FIG. 15. As the guiding system 8 is at least approximately in direct contact with the tension element 1 by sections, it is possible for enhancing the sliding properties in such areas, or over a larger area of the profile, to arrange a sliding layer 29, whereby not only the contact with the guide of the tension element 1, but also with the drive of the tension element 1 can be produced via such a sliding layer 29. Such sliding layers are preferably made of a particularly dense fabric, for example polyamide, cotton, polyester, or mixtures thereof. Such sliding layers 29 may exhibit a defined compliance in the longitudinal direction, i.e. in the direction of conveyance, in order to enhance the flexibility of the tension element 1. On the one hand, the sliding layer 29 has a low value of sliding friction vis-à-vis the guiding system 8, and an adequately high value of static friction versus the driving system 4 so as to assure that the tension element 1 is driven without any problems.

Figure 7:
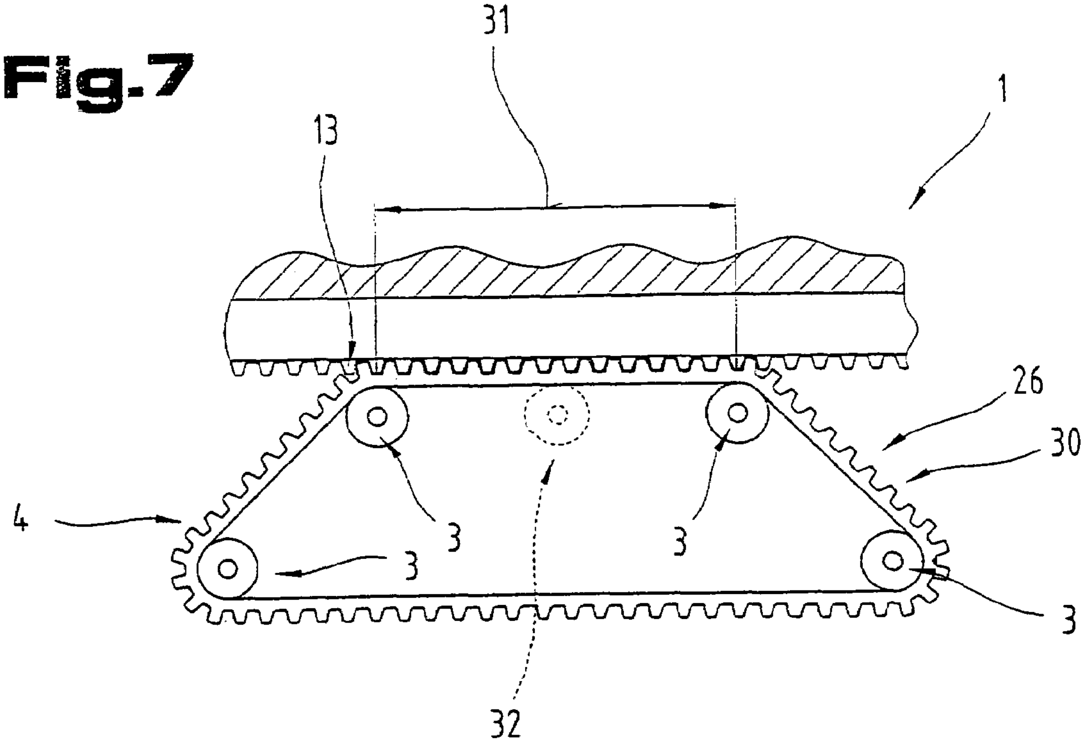
FIG. 7 shows a design variation of the driving system shown by a partly sectional view in a schematically simplified representation.

FIG. 7 shows a design variation of the belt drive according to FIGS. 5 and 6 by a schematically simplified representation. Here, the belt 26 is provided not with a smooth surface, but with a toothing 30 engaging the toothing 13 of the tension element 1 for transmitting the force. In relation to the tension element 1, the driving system 4 can be arranged as defined for the design variation shown in and described for FIG. 6.

FIG. 7 shows that the belt 26 is realized as an endless belt as well, and suitably mounted via a plurality of the reversing rollers 3. At least one of the reversing rollers 3 may at the same time serve as a driving roller and may actively connected, for example with a suitable motor, e.g. an electric motor.

The expert is familiar with such designs, so that a detailed description of the transmission of the kinetic energy to the elements of the driving system 4 is omitted.

The reversing rollers 3 are advantageously arranged with a larger spacing from each other, viewed in each case in the same plane, so that the force can be transmitted from the belt 26 to tension element 1 over a greater length 31. So as to prevent the belt 26 from slacking, at least one roller 32 exerting contact pressure may be arranged within such length 31.

Figure 8:
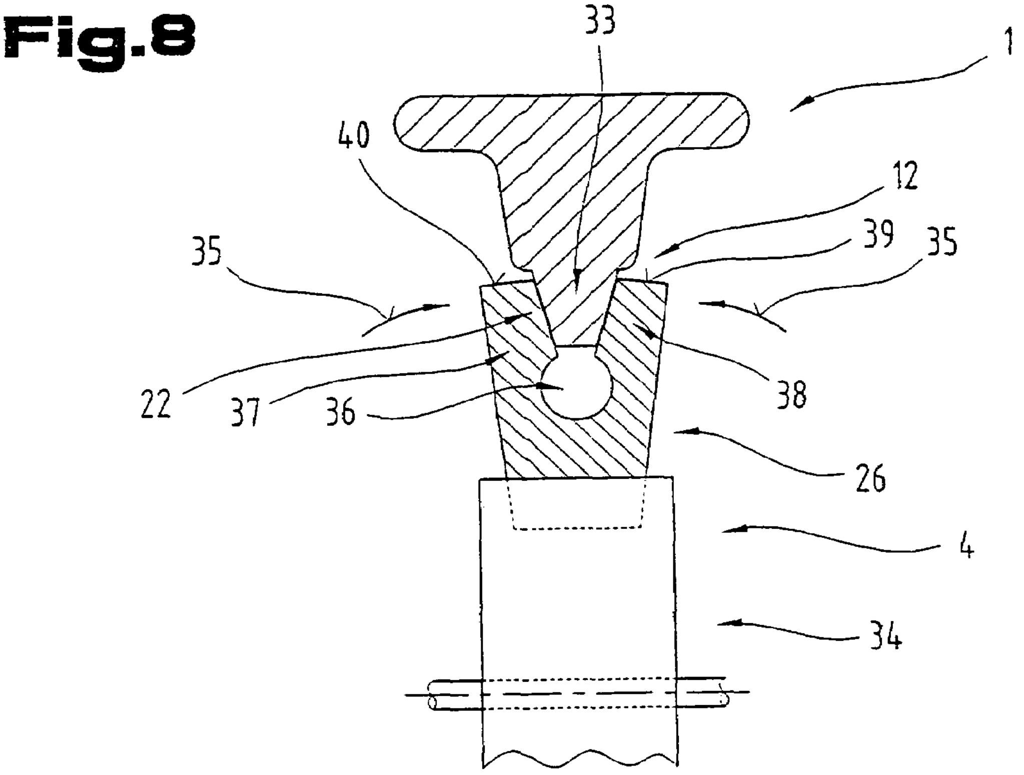
FIG. 8 shows a design variation of the driving system in a schematically simplified representation.

FIG. 8 shows another design variation of the driving system 4 for the tension element 1 in a schematically simplified representation. The tension element 1 includes a preferably wedge-shaped extension 33 on the underside 12, whereby the extension may be formed by the lower belt 22 according to FIG. 5 as well, depending on whether the profile of the tension element 1 has the shape of a "T" or a double "T".

As indicated in FIG. 8 by dashed lines, the force again may be transmitted by an independent belt 26, or the latter may be part of a driving roller 34. In embodiments where the belt 26 is an independent component, provision can be made for a plurality of the reversing rollers 3 as shown in FIG. 7, or for only one or more of the separate driving rollers 34. The belt 26 or the part facing the tension element 1 for transmitting the force, is preferably capable of deforming itself. Such deformability is indicated by the arrows 35 in FIG. 8. In this connection, such deformability is intended to permit compression of the belt 26 or the respective parts of the driving device 34. For this purpose, the latter may be realized, e.g. in the form of wedges, with a central recess 36, for example in the form of at least one, approximately round outlet. In this way, when the extension 33 of the tension element 1 is first contacted particularly in the "single-piece driving roller 34" design variation, friction grip automatically causes the jaws 37, 38 of the driving system 4 to close, so that contact is established over the full interface between the extension 33 and the jaws 37, 38 as the driving roller 34 continues to revolve, with the respective sections of the jaws 37, 38 in the vertical position in relation to the tension element 1. As rotation continues, the spacing of the end surfaces 39, 40 of the jaws, the surfaces being directed at the tension element when in the engaged position, increases again, so that the extension 33 of the tension element 1 is finally released again due to the force of pretension in the jaws, or caused by the recess 36.

If designed in the form of the belt 26, it is possible, furthermore, to intensify the contacting action by providing for an arrangement of additional contact-pressure exerting wheels (not shown in FIG. 8) for effecting the closure of the jaws 37, 38.

Figure 9:
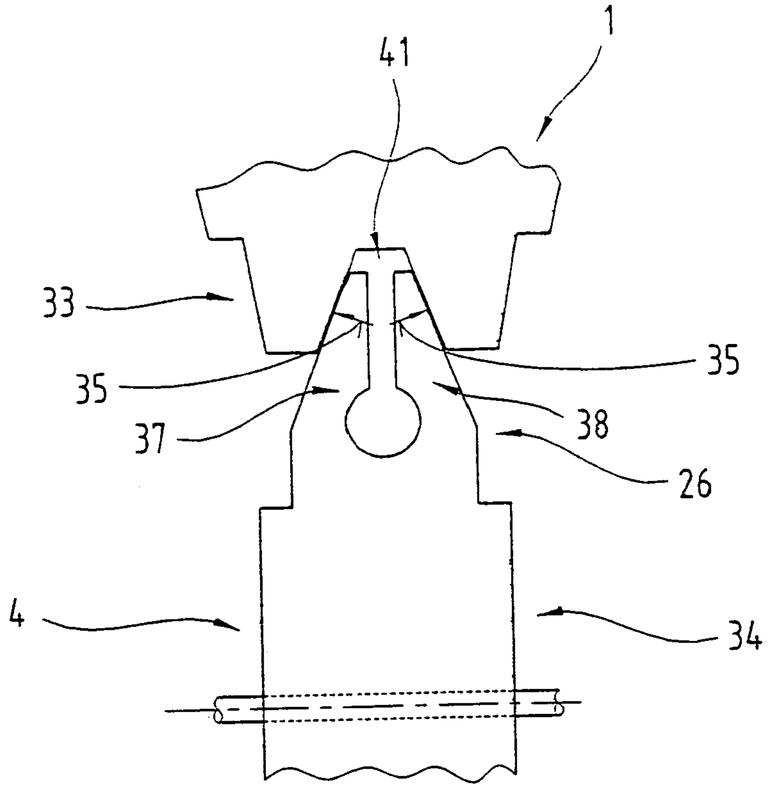
FIG. 9 shows a design variation of the driving system in a schematically simplified representation.

FIG. 9 shows a design variation highly similar to the one of FIG. 8, whereby contacting between the belt 26 or the driving roller 34 and the tension element 1 occurs inversely, i.e. viewed in the direction of conveyance, the tension element 1 or its extension 33 has a preferably wedge-shaped recess 41 disposed preferably centrally in the cross section, the recess being engaged by the jaws 37, 38 of the driving system 4 for transmitting the force. Owing to the pretension of the jaws 37, 38, application of contact pressure is effected by releasing the latter, which is indicated in FIG. 9 by the arrows 35. With this design variation, the pretension of the jaws 37, 38 may not be excessively high for preventing the latter from engaging the recess 41 both in the design variation "separate belt 26" and also the design variation "driving roller 34" in the course of rotation. With the latter design variation, contacting is again caused by the relative spacing of the jaws 37, 38 with respect to the recess 41 of the tension element 1, i.e. due to the rotation of the driving roller 34, the relative positions of the jaws 37, 38 are changed in a defined position in a manner such that their distance from the tension element 1 is reduced, permitting frictional grip preferably over a relatively large surface area. As rotation continues, the distance increases again, so that contacting is cancelled again and the jaws 37, 38 vacate the recess 41.

It is noted here that with the two last-mentioned design variations of the driving system 4, the belt 26 can be directly attached to the driving pulley or driving roller 34 by vulcanization.

Figure 10:
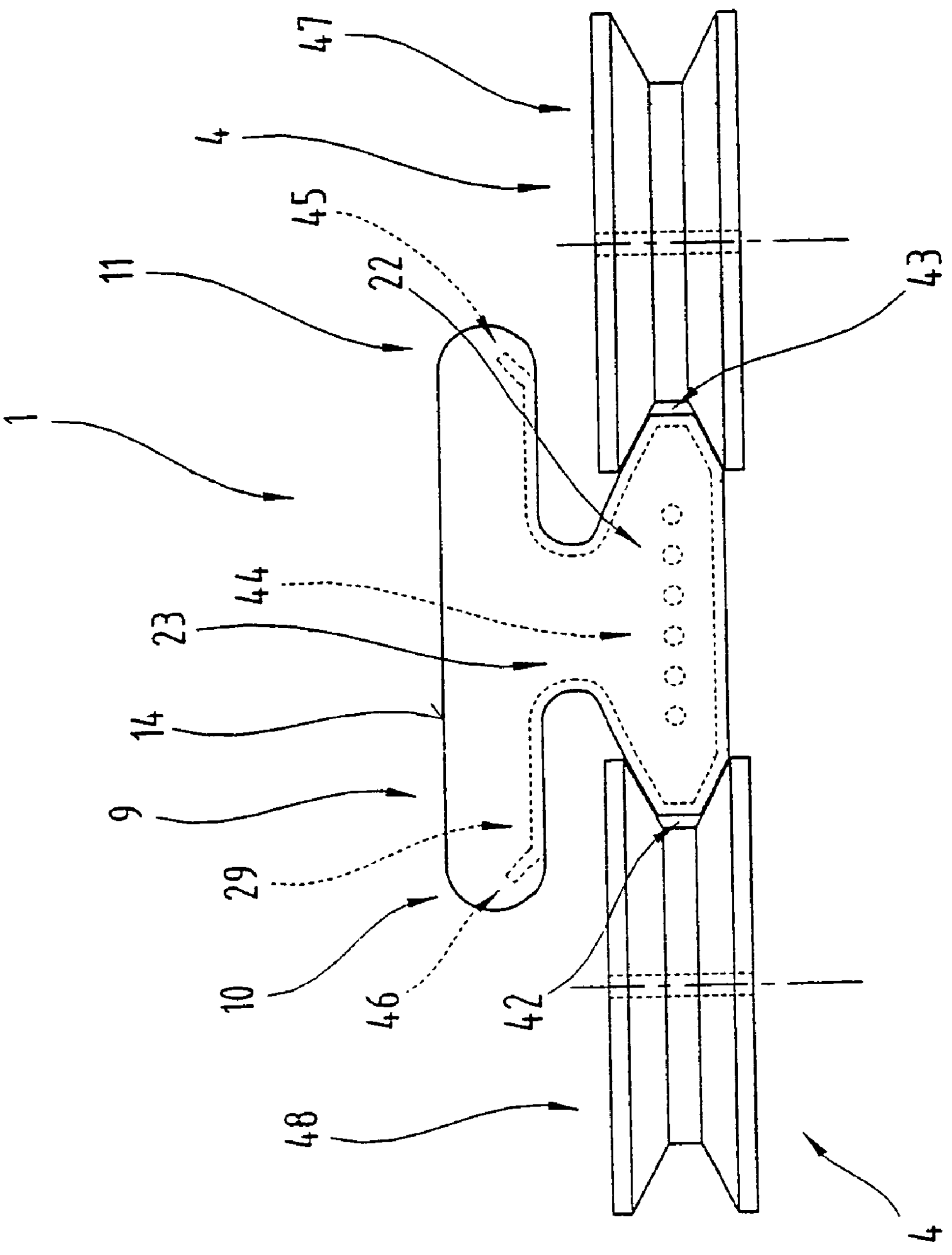
FIG. 10 shows another design variation of the tension element as defined by the invention, with a transversally arranged driving system shown by a frontal view, in a schematically simplified representation.

FIG. 10 shows another design variation of the tension element 1 and the driving system 4 by a schematic representation.

The tension element 1 consists of a profile in the form of a double "T" with the upper belt 9 and the lower belt 22, which are connected with each other via the connecting bridge 23. Again, the upper belt 9 preferably has the rounded lateral areas 10, 11, i.e. the lips of the upper belt. The lower belt 22 is preferably realized in the form of a double wedge, whereby the ends areas 42, 43 are flattened. Other forms such as, e.g. rectangular shapes or the like are possible.

The connecting bridge 23 is preferably rounded.

A tension carrier 44 is indicated in the lower belt 22 by a dashed line. This tension carrier 44 serves for receiving longitudinal forces acting on the tension element 1 owing to the driving system 4, and the tension carrier 44 has a defined minimum tearing strength also within the area of the joint. All sorts of different materials can be employed for the tension carrier 44 depending on the driving system 4, e.g. steel and aramid cord materials, or steel strip. The tension carrier 44 can be realized in the form of one single or also a multi-component piece as shown in FIG. 10, for example in the form of wire elements arranged parallel with one another at least approximately in the direction of conveyance, and may be arranged both in the tension element 1, in particular in the lower belt 22, and also on the tension element 1. Additional reinforcing inserts of the type often used in handrails according to the prior art for increasing the dimensional stability of the cross-section of the handrail, such as, for example fabric cords or the like, are not required due to the design of the profile as defined by the invention, and particularly of the approximately double-"T"-shaped tension element 1; however, such reinforcements can be employed. The cross-section of the tension element 1 remains adequately stable over a long period of time in spite of the absequence of such reinforcing elements, so that neither any increase nor decrease of the cross-section has to be expected. Both the development of any noise during contact with the guiding system 8 (not shown in FIG. 10) and excessive generation of heat can be advantageously avoided in this connection, so that any driving problems ensuing therefrom, and finally the destruction of the tension element 1 can be prevented to the greatest possible extent. In addition, by avoiding any increase in the size of the tension element 1, it is possible also to prevent individuals from getting caught in the intermediate space between the lip of the handrail, thus between in the lateral areas 10, 11 of the upper belt 9 and the guiding system 8.

In FIG. 10, the arrangement of the sliding layer 29 is indicated by dashed lines. In the present design variation, the sliding layer 29 is extending across a major part of the contour of the double-"T"-shaped cross section, in particular over the entire lower belt 22, the connecting bridge 23, and at least partly across the surface of the upper belt 9, the surface facing the lower belt 22. The ends 45, 46 of the sliding layer are preferably arranged in this connection in a manner such that they point into the interior of the upper belt 9, i.e., the ends are enclosed on all sides by the material of the upper belt 9. This permits the sliding layer 29 to be safely anchored on the tension element 1.

In the present design variation, the driving system 4 is realized in the form of transversally arranged driving pulleys 47, 48, whereby it is, of course, possible to actively connect the driving pulleys 47, 48 with other driving devices as well, e.g. electric motors, and to usefully drive such pulleys synchronously. Separate driving pulleys 47, 48 are preferably arranged on the left and right, respectively, in relation to the cross-section of the tension element 1, which permits improved transmission of force via frictional grip through pressure applied to either side, and in addition at least partial guidance of the tension element 1.

The driving pulleys 47, 48 are realized in a way such that they at least substantially conform to the contour of the double-"T"-shaped lower belt 22, so that the force can be transmitted via a large surface area as the result of the frictional grip.

For driving the tension element over the entire length, it is naturally possible to arrange several of the driving systems 4 distributed over the length.

The benefit achievable with such transversally arranged driving systems 4 is that the surface 14 of the upper belt 9 will not come into contact with any driving units, which means running marks such as, for example score lines caused by contact with the driving systems 4 can be avoided. In addition, the driving system 4 offers the benefit of compactness, so that it can be accommodated in a space-saving manner in the substructure of the conveyor system 2.

The aforementioned benefits are naturally achieved with the other design variations of the driving system 4 as well.

Furthermore, an arrangement such as shown in FIG. 10 also offers the possibility of exclusive guidance and/or support of the handrail within the area of the return movement. In this case, the driving pulleys 47, 48 are only suitably supported, but not driven, and simply idle along. In this way, no additional guiding system 8 as shown in FIG. 6 is required at least in the area of return of the handrail.

Such an arrangement of the driving pulleys 47, 48, however, also permits driving only one driving pulley 47 within the driving system 4, whereas the opposite driving pulley 48 simply idles along freely and thus serves only for guide and/or support purposes.

Figure 11:
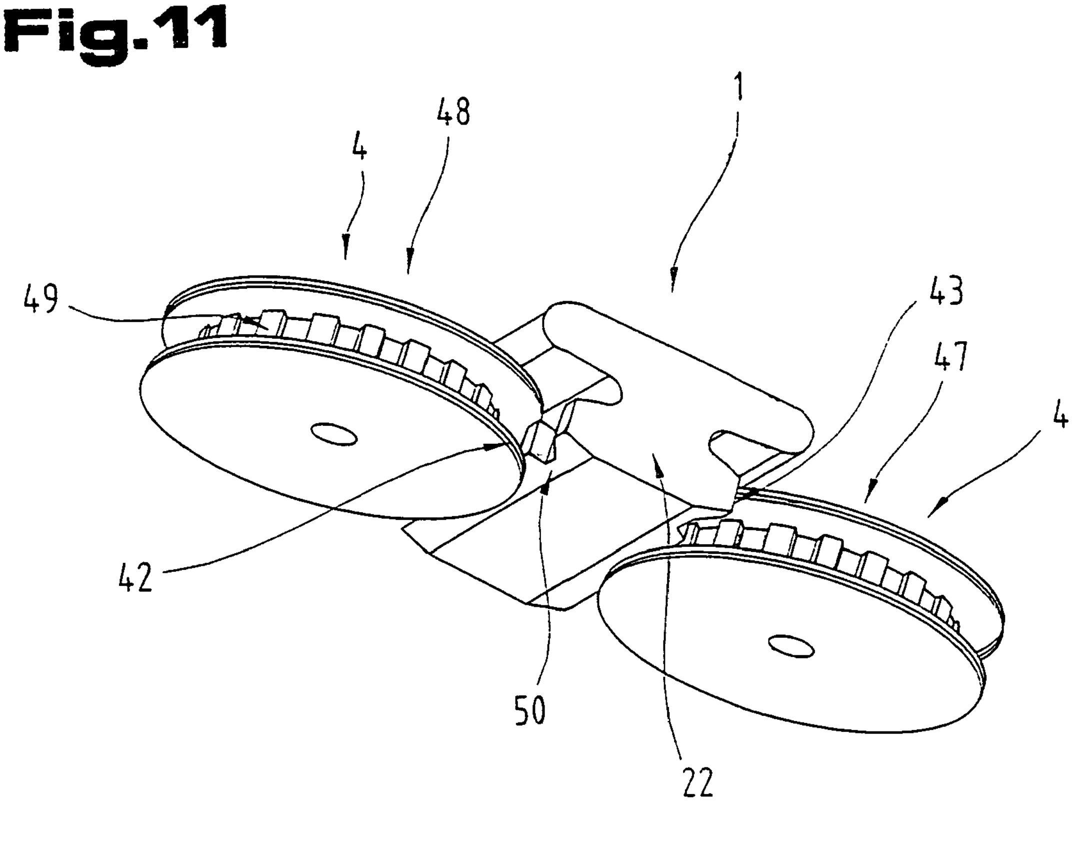
FIG. 11 is a perspective view of the tension element with the driving system according to FIG. 10, in a schematically simplified representation.

FIG. 11 shows a design variation that is very similar to the one in FIG. 10 both for the tension element 1 and the driving systems 4, which again are preferably transversally arranged on both sides of the tension element 1. The important difference between this design variation and the preceding one is that the two driving pulleys 47, 48 in the form of grooved friction wheels are provided with a toothing 49 engaging a mating toothing 50 of the lower belt 22 of the tension element 1 for transmitting the motion to the tension element 1 both nonpositively and positively. The toothing 50 are preferably arranged in the region of the double-wedge-shaped end areas 42, 43 of the lower belt 22. With this design variation as well, the sliding layer 29 (not shown in FIG. 11) naturally may be present also within the region of the toothing 50, such layer being capable of reinforcing the toothing 50.

Figure 12:
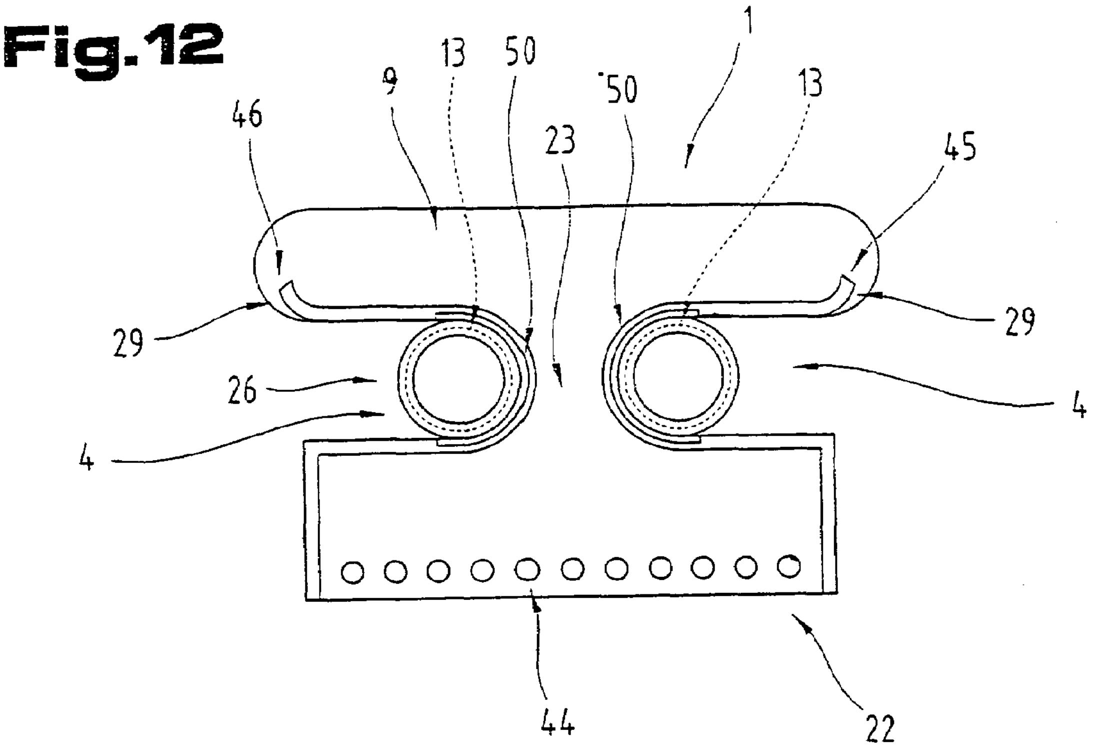
FIG. 12 is a frontal view of a design variation of the driving system as defined by the invention for a tension element according to the invention, in a schematically simplified representation.
Figure 13:
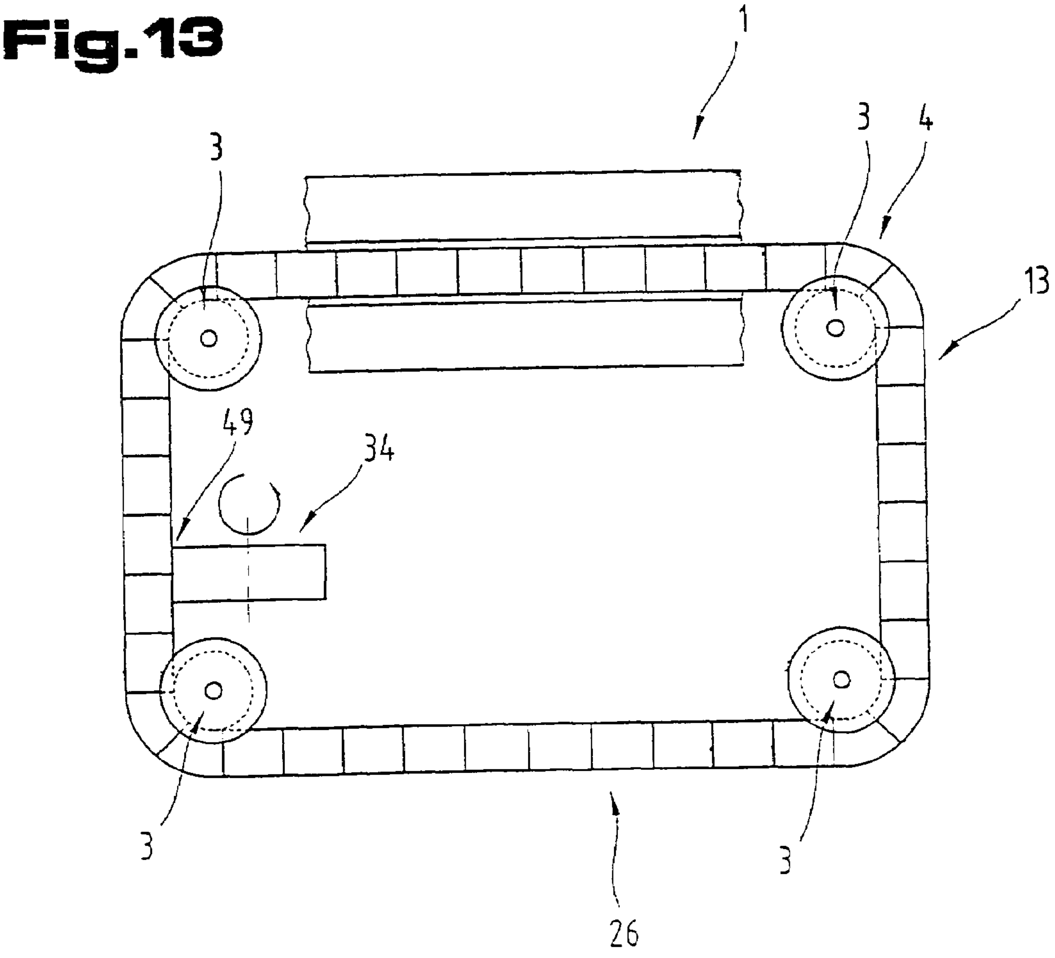
FIG. 13 is a side view of the design variation according to FIG. 12, in a schematically simplified representation.

FIGS. 12 and 13 show a schematically simplified representation of another design variation for the tension element 1 and the driving system 4 associated therewith.

Again, the tension element 1 is realized with a double-"T"-shaped cross-section and has a lower belt 22 with a rectangular shape. The transition between the lower belt 22, the connecting bridge 23 and the upper belt 9 is rounded, so that a belt 26 of the driving system 4, the latter having a rounded cross-section as well, is capable of engaging the area of transition for transmitting force.

As indicated schematically, the belt 26 is preferably provided with a toothing 13 extending at least partly over its circumference, so that the belt can be employed for safely transmitting force irrespectively of the position. This permits realization of a design variation of the driving system 4 in a highly space-saving manner.

For producing nonpositive engagement between the belt 26 and the tension element 1, the aforementioned rounded transition area is provided with the toothing 50 as well, the latter is extending across the entire area of the cross-section of the connecting bridge 23, and at least in part also across to the surfaces of the upper belt the lower belt 22 facing each other. This permits an active connection between the tension element 1 and the belt 28 over a large surface area.

As shown in FIG. 12, furthermore, the tension element 1 again is provided with the sliding layer 29, the latter starting from the lower belt, particularly the lateral end areas, and extending across the connecting bridge 23 and up to the surface of the upper belt 9 facing the lower belt 22. Again, the ends 45, 46 of the sliding layer are reshaped in the direction of the interior of the upper belt 9 for producing safe anchoring of the sliding layer 29 in the tension element 1.

Furthermore, the design variation of the tension element 1 according to FIG. 12 also shows in the lower belt 22 the tension carrier 44 in the form of individual wires disposed one next to the other.

As shown in FIG. 13 in a superior manner, the belt 26 is realized in the form of an endless belt, and provision is made for reversal by several reversing rollers 3 particularly in each area of reversal, the rollers being equipped with a toothing as well.

Furthermore, a driving roller 34 is schematically shown in FIG. 13. Transmission of the motion to the belt 26 and consequently to the tension element 1 is effected via the driving roller. For elucidating the benefit gained by using the belt 26 with a toothing 13 distributed over the circumference of the entire surface, the driving roller 34 is arranged disposed perpendicularly in relation to the direction in which the belt 26 is moving. This is shown to illustrate more clearly that it is possible in an advantageous manner to dispense with additional reversing and driving rollers 3, 34 that would be required with a "conventional" toothed belt with every change in direction by 90° in relation to the toothing 49.

Figure 14:
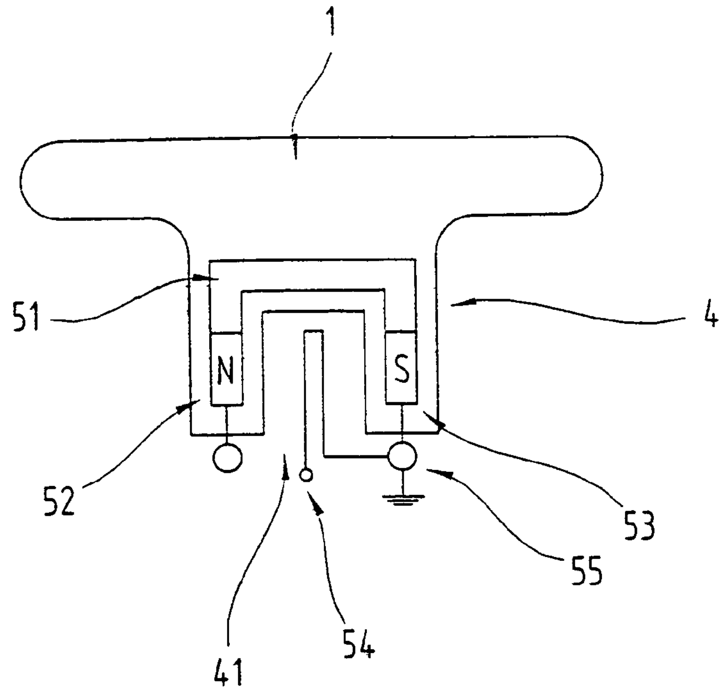
FIG. 14 shows a design variation of the driving system as defined by the invention, in a schematically simplified representation.

FIG. 14 finally shows a design variation of the tension element 1 with a driving system 4, where the force is transmitted because of interaction between magnetic and electric forces. For this purpose, one or more magnets 51 or magnetic or magnetizable particles are arranged either in the vertically extending component of the "T"-shaped profile of the tension element 1, as shown in FIG. 14, or in the lower belt 22 (not shown in FIG. 14). Disposed between a north pole 52 and a south pole 53, the profile has the recess 41, where a series of conductor loops 54 is subsequently accommodated viewed in the direction of conveyance. One of the ends of each conductor loop 54 is connected to a conductor 55. The second end is connected to a second conductor (not shown in FIG. 14), for example via a thyristor. The conductors 55 are connected to an energy supply. Each thyristor generates power in the respective conductor loop after the latter has come to rest between the magnetic poles. The interaction so generated between the current in the conductors and the magnetic field effects a forward movement of the tension element 1. The magnets 51 naturally need not to be arranged over the entire length of the tension element 1. The magnets 51 have to be spaced from each other in such a manner that the electric fields generated by the magnets 51 will at least adjoin one another within their effective range, so that a constant advance movement of the tension element 1 in the direction of conveyance can be preset, or against the latter is possible upon reversal of the polarization of the magnets 51.

The advantage of this design variation of the driving system 4 is that a large number of mechanically moving components can be dispensed with, which renders this system very maintenance-friendly, on the one hand, and provides it with a low structural height on the other.

Finally, FIG. 15 shows a schematically simplified and partly sectional frontal view of the design variation of a guiding system 8.

The guiding system 8 preferably has end areas designed in such a way that they are capable of engaging the recess between the upper and lower belts 9 and 22, respectively. The guiding system 8 is preferably realized in the form of multiple components and particularly includes of at least one guide rail 56 and at least one holding and/or supporting element 57, whereby the latter is preferably arranged on both sides; as well as of at least one, preferably two clamping elements 58 disposed between the guide rail 56 and the holding and/or supporting element 57.

In an overlapping area 59, the clamping element 58 and/or the guide rail 56 are provided with either the notches 60 and the projections 61, the latter being formed vis-à-vis the former, so that the clamping element 58 and the guide rail 56 can safely engage one another.

For fixing the tension element 1 on the holding and/or supporting element 57, for example in case of its embodiment as a handrail of the balustrade, the holding and/or supporting element 57 is cantilevered at least by sections in the area where the clamping element 58 and the guide rail 56 are overlapping each other, by at least a wall thickness 62 of the clamping element 58 vis-a-vis the remaining expanse of the holding and/or supporting element 57 in the end areas 63, 64.

Furthermore, the holding and/or supporting element 57 and the guide rail 56, in an area 65 disposed beneath the clamping element 55, may border on each other there at least by sections, so that the elements can be fixed there, for example via the fixing elements 66, e.g. screws or the like, which are indicated in FIG. 15 by the lines 67. By arranging the detachable fixing elements 66, e.g. screws, the tension element 1 can be removed, if need be, because after the guide rail 56 has been removed from the area of the holding and/supporting element 57, the clamping element 58 can be detached from the guide rail 56 as well.

The clamping element 58 is preferably realized in such a way that it has areas for contacting both the lower belt 22 and also the upper belt 9, whereby an end area 68 of the clamping element is pointing at the lower belt 22 preferably at an acute angle 69. Contacting between the clamping element 58 and the upper belt 9 or lower belt 22 preferably takes place via the sliding layer 29, which again is extending over a major part of the tension element 1; viewed in the cross-section, in particular across the surface of the lower belt 22, the connecting bridge 23, as well as the surface of the upper belt 9 facing the lower belt 22. In this way, low-friction guidance via the guide rail 56 is possible as well within the area of the lower belt 22. The present figure shows that the sliding layer 29 may be only partially enveloped by the tension element 1, so that the layer is forming a part of the surface 14 of the tension element 1.

It is naturally possible to design the guiding system 8 in the form of one single part if, for example, the end areas of the guide rail 56 are at the same time forming the end areas 68 of the clamping element described above. With suitably elastic deformability of the end areas, it is possible to insert the tension element 1 into the guiding system 8, whereby the end areas are adapted to fit tightly and will elastically rebound into their starting position and thus into the recess after the latter has been reached between the upper and lower belts 9, 22.

Also the guide rail 56 naturally can be realized in the form of one single piece or of two or more guide rails having no contact among each other.

The benefits to be gained with the conveyor device 2, in particular with the tension element 1, the driving system 4 and the guiding system 8 are multifarious. The advantage offered by the dimensional stability of the "T"- or double-"T"-shaped profile for the tension element 1 vis-a-vis the "C"-shaped profiles known from the prior art, for example, has already been addressed above.

Another benefit is that the manufacture of the tension element 1 is simplified as compared to conventional "C"-shaped sections, which are produced from a multitude of pretreated semi-finished products. The latter have to be assembled first in the non-vulcanized condition in a relatively complicated way, manually or with machines. In the vulcanization process, the tension element 1, e.g. the handrail, is discontinuously vulcanized in a mold that is responsible for the outside dimensions, the overall height and the overall width of the cross-section, using a suitable core that, in turn, is responsible for the inside dimensions, the lip width, the inside width and the inside height. Conditioned by the sandwich construction, local changes in the cross-section occur in such a process over the length of the tension element. Such dimensional changes are additionally compounded by the open "C"-shaped profile according to the prior art, with the result that if the changes are outside the range of tolerances permitted by the customer, the tension element cannot be used and thus has to discarded as waste.

Furthermore, the tension elements 1 as defined by the invention are required to withstand a great number of flexural changes while in operation in conveyor devices, from which effects ensue accordingly, acting on the cross-section of the tension element. As a consequence of even only a minor share of irreversible deformation, changes in the cross-section may occur in the course of operation due to the "C"-shape of the cross-section as the number of changes in the flexure rises, so that if such changes are excessive, this will in turn lead to failure of the tension element 1.

Furthermore, the tension elements 1 are usually driven by driving systems 4 that operate with a flexure of the tension element 1 via the back. Such flexing will also have a negative effect on the surface of the tension element 1 that is facing the individual object or person. Such stress is fouling the surface and leaves behind running marks. In extreme cases, this may lead to increased growth of cracks and failure of the tension element 1. In addition, in most driving systems 4, the tension element 1 has to be initially tensioned for permitting the required driving torque to be transmitted. Any excessive pretension, however, substantially reduces the service life of the tension element 1 due to increased de-lamination, on the one hand, as well as changes in its length on the other.

On the other hand, the novel profile permits for this purpose of application in particular as a belt conveyor, handrail for escalators, people-movers or the like the omission of reinforcing inserts, if need be, which permits a reduction of the labor expenditure in the manufacture of semi-finished products and final products, and therefore cost savings associated therewith.

The cross-section of the tension element 1, which is novel for the present purpose of application, permits that changes in the cross-section conditioned by production engineering, and failure of the tension element 1 caused by excessive changes in the cross-section while it is in operation, are reduced or at least excluded in part. Owing to the novel transversal driving system 4, which is capable of operating without initial tensioning of the tension element 1, and by virtue of the guiding system 8 as defined by the invention, an even and safe drive of the tension element 1 is made possible. This, of course, is applicable to all other design variations shown herein for the driving system 4 as well. In addition, negative flexing across roller bodies in the escalator substructure, for example in escalators with handrail drive, is avoided, so that the surface of the tension element 1 remains free of dirt and scoring throughout its useful life. In addition to quality enhancement, this contributes to prolonging the duration of the service life of the tension element 1 as well.

Furthermore, it is beneficial that the driving system 4 is extremely compact and space-saving overall and can be accommodated, e.g. in the substructure of the escalator, which not least contributes to reducing the space required for the entire escalator installation.

With the novel tension element 1, the upper component, particularly the upper belt 9, e.g. in its "handrail", has the function of serving as a handle gripped by the rider. The upper component preferably consists of an elastomer or elastomer mixture.

The lower component, on the other hand, particularly the lower belt 22, fulfills three functions: on the one hand, it serves for driving the tension element 1; furthermore, for positively connecting the tension element 1 and the guiding system 8, and finally, it also represents a contact surface vis-à-vis the driving system 4 and the guiding system 8.

If the tension element 1 is made of rubber or gummed materials, it can be produced by conventional discontinuous press vulcanization because of its low flexural strength. However, continuous production by extrusion based on plastic is feasible as well. The tension element 1, e.g. the upper belt 9, lower belt 22 and connecting bridge 23 thus can be produced in this manner as one single piece.

The novel guiding system 8, moreover, in the case of its "handrail" design variation, prevents throughout its useful life any ill-intended dismantling of the tension element 1, e.g. by the rider, in a highly effective way.

Owing to the transversally arranged driving system 4 or the other driving systems 4 shown herein, a return of the tension element 1, i.e. of the so-called lower strand in the "belt conveyor" application case, is possible also when it is employed as a handrail, in a manner such that the surface of the tension element 1 coming into contact with the individual rider to be transported, is not in contact with any guiding elements.

The practical test of the tension element 1 was checked with the help of determining the tear-off force in the case of the "handrail" design variation. This check serves for estimating the driving force maximally transmittable between the driving system 4 and the handrail. As opposed to realistic conditions, the driving system 4 was blocked with the test equipment and the handrail was pulled through the system.

The maximum force required for pulling it through can be used for estimating the maximally transmittable driving force.

The test equipment includes a device specially developed for this test, in which the transversally realized driving system 4 was tested. The test equipment included three pairs of V-gears that can be contacted with the lower belt 22 of the tension element 1, i.e. of the handrail. For the test, the handrail is chucked in the test apparatus, whereby different values of clamping force and normal force can be adjusted via the V-gears by spring forces. Furthermore, one or two V-gears of a pair of gears opposing each other can be selectively blocked in each case, so that it is possible to simulate both the unilateral the bilateral drives.

By a tensile strength tester, a defined number of V-gears as well as number of blocked gears is tested at defined settings, i.e. of a normal force, and the maximum force, i.e. the tear-off force required to pull the handrail from the test apparatus, is determined.

It was found that a clear relation exists between the normal force, the number of V-gears and the type of drive used, i.e. unilateral or bilateral drive. The tear-off force and thus the maximally transmittable driving force rises with the increase in normal force and number of V-gears. A bilateral drive, furthermore, shows higher transmittable driving forces.

The values shown in the present table for the novel tension elements 1 were determined in connection with the conveyor device 2 and the driving system 4.

Unilateral Drive (force of pressure applied in N; gear diameter=100 mm):

Force of pressure applied in N

| | Unit 1 | Unit 2 | Unit 3 |
|---|---|---|---|
| Test 1 | 500 | 0 | 0 |
| Test 2 | 650 | 0 | 0 |
| Test 3 | 800 | 0 | 0 |
| Test 4 | 500 | 500 | 0 |
| Test 5 | 650 | 650 | 0 |
| Test 6 | 800 | 800 | 0 |
| Test 7 | 500 | 500 | 500 |
| Test 8 | 650 | 650 | 650 |
| Test 9 | 800 | 800 | 800 |

Spring Length in mm (Spacing incl. shims)

| | Unit 1 | Unit 2 | Unit 3 | x max. tear-off force in N |
|---|---|---|---|---|
| Test 1 | 47 | — | — | 392 |
| Test 2 | 46 | — | — | 502 |
| Test 3 | 45 | — | — | 581 |
| Test 4 | 47 | 47 | — | 697 |
| Test 5 | 46 | 46 | — | 804 |
| Test 6 | 45 | 45 | — | 1029 |
| Test 7 | 47 | 47 | 47 | 918 |
| Test 8 | 46 | 46 | 46 | 1061 |
| Test 9 | 45 | 45 | 45 | 1444 |

L0 = 51 mm

Bilateral Drive (force of pressure applied in N; gear diameter=100 mm):

Force of Pressure Applied in N

| | Unit 1 | Unit 2 | Unit 3 |
|---|---|---|---|
| Test 1 | 500 | 0 | 0 |
| Test 2 | 650 | 0 | 0 |
| Test 3 | 800 | 0 | 0 |
| Test 4 | 500 | 500 | 0 |
| Test 5 | 650 | 650 | 0 |
| Test 6 | 800 | 800 | 0 |
| Test 7 | 500 | 500 | 500 |
| Test 8 | 650 | 650 | 650 |
| Test 9 | 800 | 800 | 800 |

Spring Length in mm (Spacing incl. shims)

| | Unit 1 | Unit 2 | Unit 3 | x max. tear-off force in N |
|---|---|---|---|---|
| Test 1 | 47 | — | — | 630 |
| Test 2 | 46 | — | — | 747 |
| Test 3 | 45 | — | — | 737 |
| Test 4 | 47 | 47 | — | 988 |
| Test 5 | 46 | 46 | — | 1064 |
| Test 6 | 45 | 45 | — | 1349 |
| Test 7 | 47 | 47 | 47 | 1406 |
| Test 8 | 46 | 46 | 46 | 1566 |
| Test 9 | 45 | 45 | 45 | 1865 |

L0 = 51 mm

In the tables, units 1 to 3 represent three pairs of V-gears; the spring length permits drawing conclusions with respect to the force of pretension, i.e. the normal force.

For the sake of good order it is finally pointed out that in the interest of superior appreciation of the tension element 1, the latter or its components are partly shown untrue to scale and/or enlarged and/or reduced.

The problems on which the independently inventive solutions are based can be derived from the specification.

Above all, the individual design variations and measures shown in FIGS. 1, 2; 3, 4; 5, 6; 7; 8; 9; 10; 11; 12, 13; 14; 15 may form an aspect of independent solutions as defined by the invention. The respective problems and solutions as defined by the invention are specified in the detailed descriptions of the figures.

LIST OF REFERENCE NUMERALS

1 Tension element
2 Conveying system
3 Reversing roller
4 Driving system
5 Supporting roller
6 Recess
7 Reversing roller
8 Guiding system
9 Upper belt
10 Side area
11 Side area
12 Underside
13 Toothing
14 Surface
15 Supporting element
16 Width
17 Width
18 Area
19 Area

20 Extension
21 Extension
22 Lower belt
23 Connecting bridge
24 Recess
25 Belt pulley
26 Belt
27 Notch
28 Notch
29 Sliding layer
30 Toothing
31 Length
32 Contact pressure-exerting roller
33 Extension
34 Driving roller element
35 Arrow
36 Recess
37 Jaw
38 Jaw
39 End surface of jaw
40 End surface of jaw
41 Recess
42 End area
43 End area
44 Tension carrier
45 End of sliding layer
46 End of sliding layer
47 Driving pulley
48 Driving pulley
49 Toothing
50 Toothing
51 Magnet
52 North pole
53 South pole
54 Conductor loop
55 Conductor
56 Guide rail
57 Holding and/or supporting element
58 Clamping element
59 Area
60 Notch
61 Projection
62 Wall thickness
63 End area
64 End area
65 Area
66 Fixing element
67 Line
68 End area of clamping element
69 Angle

What is claimed is:

1. A handrail for one of an escalator and a people-mover comprising:

a cross-section formed by a first upper cross-sectional part and a second lower cross-sectional part;

the first cross-sectional part comprises an upper belt structured and arranged to form a handle for individuals to be transported by one of the escalator and the people-mover;

the second cross-sectional part comprises a lower belt structured and arranged to form an active connection with a guiding system and a driving system; and a connecting bridge that connects the upper belt to the lower belt, wherein the cross-section has a double "T" shape and the lower belt comprises side areas that extend beyond the connecting bridge as viewed in the cross section, and said side areas are partially double-wedge-shaped for a friction fit with a drive device.

2. The handrail according to claim 1, further comprising:

at least one transition between the connecting bridge and one of the upper belt and the lower belt, wherein the at least one transition is rounded as viewed in the cross section.

3. The handrail according to claim 1, wherein at least two of the first cross-sectional part, the second cross-sectional part, and the connecting bridge form a single piece.

4. The handrail according to claim 1, wherein at least one of the lower belt, the connecting bridge, and the upper belt comprises at least one sliding element, the sliding element comprising a sliding layer composed of a fabric made of at least one of a polyamide, a cotton, and a polyester.

5. The handrail according to claim 4, wherein the at least one sliding element forms a contact surface for one of the guiding system and the driving system.

6. The handrail according to claim 4, wherein the sliding element has two ends opposing one another anchored in the upper belt.

7. The handrail according to claim 4, wherein the sliding element is partially arranged on an outer surface of one of the lower belt, the connecting bridge, the upper belt, and the upper belt facing the lower belt.

8. The handrail according to claim 4. wherein the sliding element has a contour of at least one of the first cross-sectional part, the second cross-sectional part, the lower belt, the connecting bridge, and a component of the upper belt facing the lower belt, when viewed in the cross section.

9. The handrail according to claim 1, wherein the surface of at least one of the lower belt, the connecting bridge, and the upper belt has at least partial toothing, in a plane extending perpendicular to a cross-sectional area of a surface.

10. The handrail according to claim 9, wherein the toothing is arranged on the surface of the lower belt facing away from the upper belt.

11. The handrail according to claim 9, wherein the toothing is arranged on a surface of side areas of the lower belt.

12. The handrail according to claim 9, wherein the toothing is arranged on a surface of side areas of the lower belt.

13. The handrail according to claim 12, wherein the surface of side areas of the lower belt is in the double-wedge-shaped end areas.

14. The handrail according to claim 1, wherein one of the lower belt, the upper belt, and the connecting bridge comprises at least one of a polymeric material and an elastomer.

15. The handrail according to claim 14, wherein the polymeric material comprises TPU and the elastomer comprises rubber.

16. The handrail according to claim 1, wherein at least one of the lower belt, the upper belt, and the connecting bridge are produced by one of press vulcanization and extrusion.

17. The handrail in combination with the guiding system according to claim 16, wherein the clamping element has a substantially U-shaped profile composed of a base and two legs.

18. The handrail in combination with the guiding system according to claim 17, wherein the legs have at least one of different lengths and different angles jointly with the base.

19. The handrail in combination with the guiding system according to claim 17, wherein the guide rail has a U-shaped profile.

20. The handrail according to claim 1 in combination with a guiding system, the guiding system comprising:

a guiding element having two end areas opposing each other and engaging a recess formed between an upper belt and a lower belt of the handrail, wherein the guiding element comprises of at least one of a guide rail, a holding element, a supporting element, and a clamping element.

21. The handrail in combination with the guiding system according to claim 20, wherein the guide rail and the clamping element comprise correspondingly profiled and partially toothed surfaces opposing each other.

22. The handrail in combination with the guiding system according to claim 20, wherein at least one of the holding element and supporting element has an end area offset by a wall thickness of the clamping element with respect to a remaining area of the at least one holding and supporting element.

23. The handrail in combination with the guiding system according to claim 20, wherein the guide rail is structured and arranged to be nonpositively connectable with one of the holding element and supporting element with fixing elements.

24. The handrail in combination with the guiding system according to claim 20, wherein at least one of the holding element and supporting element is a balustrade of one the escalator and the people-mover.

25. The handrail according to claim 1 in combination with a driving system, the driving system comprising:

at least one driving element structured and arranged to form an active connection with the handrail;

at least one element generating kinetic energy; and at least one connecting member between the driving element and the element generating kinetic energy, wherein the driving element is arranged in a manner such that the kinetic energy is laterally transmitted to the handrail in relation to a direction of movement or movement of the lower belt of the double-"T"-shaped profile of the handrail.

26. The handrail in combination with the driving system according to claim 25 wherein the at least one element generating kinetic energy is an electric motor.

27. The handrail in combination with the driving system according to claim 25, wherein the driving element is formed by at least one of a belt, a driving pulley, and a toothed gear.

28. The handrail in combination with the driving system according to claim 27, wherein the belt is a V-belt having wedge-shaped end areas with flattened ends on both sides, viewed in the cross section.

29. The handrail in combination with the driving system according to claim 27, wherein the belt has toothing.

30. The handrail in combination with the driving system according to claim 29, wherein viewed over the cross section of the belt, the toothing extends across a circumference.

31. The handrail in combination with the driving system according to claim 27, wherein viewed in the cross section, the belt has a recess along a center axis, said recess dividing an end area of the belt in two jaws opposing one another.

32. The handrail in combination with the driving system according to claim 27, wherein the driving pulley is a grooved pulley structured and arranged to rest against double-wedge-shaped end zones of the lower belt of said handrail.

33. The handrail in combination with the driving system according to claim 32, wherein the driving pulley, has a toothing distributed over a circumference.

34. The handrail in combination with the driving system according to claim 32, wherein the driving pulley comprises a grooved pulley and the grooved pulley has countersunk toothing distributed over a circumference.

35. The handrail according to claim 1 in combination with one of an escalator, such that the handrail is a revolving endless handrail, the escalator comprising:

a guiding system; and a driving system for a belt-shaped tension element, whereby the guiding system partially encompasses the handrail and the driving system is structured and arranged to be connected with the handrail.

36. The handrail in combination with the escalator according to claim 35, wherein the guiding system comprises:

a guiding element with two end areas opposing one other and engaging a recess formed between an upper and a lower belt of the handrail, wherein the guiding element is comprised of at least one of a guide rail, holding element, supporting element, and a clamping element.

37. The handrail in combination with the escalator according to claim 35, wherein the driving system comprises:

at least one driving element structured and arranged to form an active connection with the handrail;

at least one element generating kinetic energy; and at least one connecting member between the at least one driving element and the at least one element generating kinetic energy, wherein the at least driving element structured and arranged such that the kinetic energy is laterally transmitted to the handrail with respect to one of a direction of movement and a movement of the lower belt of the double-"T"-shaped profile of the handrail.

38. A handrail for one of an escalator and a people-mover comprising:

cross-section formed by a first upper cross-sectional part and a second lower cross-sectional part;

the first cross-sectional part comprises an upper belt structured and arranged to form a handle for individuals to be transported by one of the escalator and the people-mover;

the second cross-sectional part comprises a lower belt structured and arranged to form an active connection with a guiding system and a driving system;

a connecting bridge that connects the upper belt to the lower belt, wherein the cross-section has a double "T" shape and the lower belt comprises side areas that extend beyond the connecting bridge as viewed in the cross section, and said side areas are wedge-shaped; and at least one tension carrier composed of at least one of a steel cord, a steel sheet, and an aramid cord, and said at least one tension carrier arranged at least one of on and in the lower belt.

39. A handrail for one of an escalator and a people-mover comprising:

a cross-section formed by a first upper cross-sectional part and a second lower cross-sectional part;

the first cross-sectional part comprises an upper belt structured and arranged to form a handle for individuals to be transported by one of the escalator and the people-mover;

the second cross-sectional part comprises a lower belt structured and arranged to form an active connection with a guiding system and a driving system;

a connecting bridge that connects the upper belt to the lower belt, wherein the cross-section has a double "T" shape and the lower belt comprises side areas that extend beyond the connecting bridge as viewed in the cross section, and said side areas are wedge-shaped; and at least one of a magnetic and magnetizable element arranged at least one of in and on the lower belt.

40. A handrail for one of an escalator and a people-mover in combination with a drive system for the handrail, comprising:

a cross-section formed by a first upper cross-sectional part and a second lower cross-sectional part;

the first cross-sectional part comprises an upper belt structured and arranged to form a handle for individuals to be transported by one of the escalator and the people-mover;

the second cross-sectional part comprises a lower belt structured and arranged with side areas that are at least partially double wedge shaped when viewed along a length of the lower belt;

a connecting bridge that connects the upper belt to the lower belt, wherein the first and second cross-sectional parts are arranged to form a double "T" shape and, when viewed along a length of the lower belt, the side areas extend beyond the connecting bridge; and pulleys arranged on opposite sides of the lower belt and adjacent the at least partially double-wedge-shaped side areas to drive the belt.

41. The handrail in combination with the drive system for the handrail in accordance with claim 40, wherein at least one of the pulleys is formed with opposing double wedge faces, and the at least one pulley is arranged in frictional contact with at least one of the at least partially double-wedge-shaped side areas.

42. The handrail in combination with the drive system for the handrail in accordance with claim 40, wherein at least a portion of at least one of the pulleys is in contact with at least a portion of at least one of the at least partially double-wedge-shaped side areas.

43. The handrail in combination with the drive system for the handrail in accordance with claim 40, wherein at least one of the pulleys is formed with a circumferential toothing, and the lower belt includes a circumferential toothing formed in at least one of the at least partially double-wedge-shaped side areas.

* * * * *